(12) United States Patent
Odate

(10) Patent No.: US 8,046,136 B2
(45) Date of Patent: Oct. 25, 2011

(54) VEHICLE SEATBELT APPARATUS, VEHICLE HAVING THE VEHICLE SEATBELT APPARATUS AND METHOD FOR CONTROLLING VEHICLE SEATBELT

(75) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 502 days.

(21) Appl. No.: 12/347,346

(22) Filed: Dec. 31, 2008

(65) Prior Publication Data

US 2009/0173816 A1    Jul. 9, 2009

(30) Foreign Application Priority Data

Jan. 7, 2008    (JP) ................................. 2008-000475

(51) Int. Cl.
*B60R 22/00* (2006.01)

(52) U.S. Cl. ....... 701/45; 180/268; 242/390.9; 280/807; 297/475

(58) Field of Classification Search .................. 180/268; 242/374, 390.9; 280/807; 297/474, 475, 297/481; 701/45
See application file for complete search history.

(56) References Cited

U.S. PATENT DOCUMENTS

| | | | | |
|---|---|---|---|---|
| 5,181,739 A * | 1/1993 | Bauer et al. .................... | 280/807 |
| 5,244,231 A | 9/1993 | Bauer et al. | |
| 5,452,862 A | 9/1995 | Ray | |
| 5,765,774 A * | 6/1998 | Maekawa et al. ........... | 242/390.9 |
| 7,077,231 B2 * | 7/2006 | Midorikawa .................. | 180/268 |
| 7,654,572 B2 * | 2/2010 | Midorikawa ............... | 280/801.1 |
| 2003/0094534 A1 | 5/2003 | Fujii et al. | |
| 2005/0184184 A1 | 8/2005 | Kohlndorfer et al. | |

FOREIGN PATENT DOCUMENTS

| | | |
|---|---|---|
| DE | 19927731 | 12/2000 |
| EP | 1712435 | 10/2006 |
| EP | 1864868 | 12/2007 |
| JP | 2005-263077 | 9/2005 |
| JP | 2006-142984 | 6/2006 |
| JP | 2006-143154 | 6/2006 |
| JP | 2007-500647 | 1/2007 |
| WO | WO 2005/016707 | 2/2005 |

* cited by examiner

*Primary Examiner* — Ruth Ilan
*Assistant Examiner* — Robert A Coker
(74) *Attorney, Agent, or Firm* — Ditthavong Mori & Steiner, P.C.

(57) ABSTRACT

A vehicle seatbelt apparatus includes a belt, a belt reel, a position detector, a motor, a clutch, and a control device. The belt is wound around the belt reel. The position detector is configured to detect a rotational position of the belt reel. The motor is configured to rotate the belt reel. The clutch is configured to connect or disconnect the motor and the belt reel. The control device is configured to control the clutch and a current supplied to the motor. The control device includes a return amount detector which is configured to detect a return amount of the belt reel in a drawing direction of the belt based on the rotational position of the belt reel detected by the position detector after the belt is wound around the belt reel and then the clutch disconnects the motor and the belt reel.

12 Claims, 17 Drawing Sheets

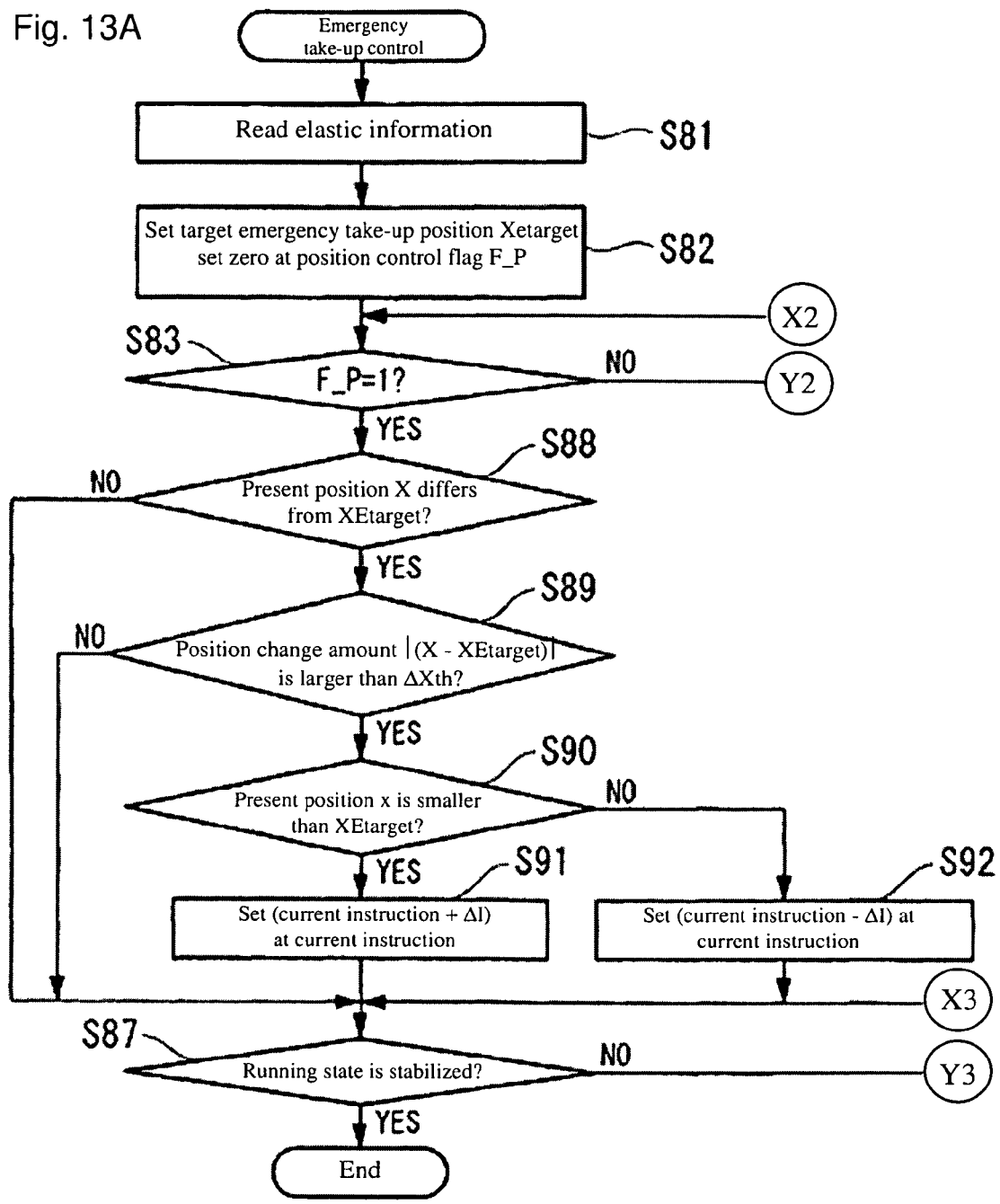

VEHICLE SEATBELT APPARATUS, VEHICLE HAVING THE VEHICLE SEATBELT APPARATUS AND METHOD FOR CONTROLLING VEHICLE SEATBELT

CROSS-REFERENCE TO RELATED APPLICATIONS

The present application claims priority under 35 U.S.C. §119 to Japanese Patent Application No. 2008-000475, filed Jan. 7, 2008. The contents of this application are incorporated herein by reference in their entirety.

BACKGROUND OF THE INVENTION

1. Field of the Invention

The present invention relates to a vehicle seatbelt apparatus, a vehicle having the seatbelt apparatus, and a method for controlling a vehicle seatbelt.

2. Discussion of the Background

Conventionally, there is known a seatbelt control apparatus, in which a determination whether or not a passenger wears heavy clothing is made based on information such as an ambient temperature outside a vehicle, a set temperature of an air conditioner, a time and date, a present position, and an in-vehicle temperature which influences the clothing of the passenger. When the passenger wears heavy clothing, the degree to which a seatbelt is taken up is adjusted if the vehicle approaches an obstacle (for example, see Japanese Unexamined Patent Publication No. 2005-263077). The contents of Japanese Unexamined Patent Publication No. 2005-263077 are incorporated herein by reference in their entirety.

With the conventional seatbelt control apparatus, the determination whether or not the passenger wears heavy clothing is indirectly made simply based on the information which influences the clothing of the passenger. Therefore, because the loosened state of the seatbelt does not properly reflected in the adjustment of the taken-up degree of the seatbelt, possibly the passenger feels excessive discomfort in taking up the seatbelt.

SUMMARY OF THE INVENTION

According to one aspect of the present invention, a vehicle seatbelt apparatus includes a belt, a belt reel, a position detector, a motor, a clutch, and a control device. The belt is wound around the belt reel. The position detector is configured to detect a rotational position of the belt reel. The motor is configured to rotate the belt reel. The clutch is configured to connect or disconnect the motor and the belt reel. The control device is configured to control the clutch and a current supplied to the motor. The control device includes a return amount detector which is configured to detect a return amount of the belt reel in a drawing direction of the belt based on the rotational position of the belt reel detected by the position detector after the belt is wound around the belt reel and then the clutch disconnects the motor and the belt reel.

According to another aspect of the present invention, a vehicle includes a seatbelt apparatus. The seatbelt apparatus includes a belt, a belt reel, a position detector, a motor, a clutch, and a control device. The belt is wound around the belt reel. The position detector is configured to detect a rotational position of the belt reel. The motor is configured to rotate the belt reel. The clutch is configured to connect or disconnect the motor and the belt reel. The control device is configured to control the clutch and a current supplied to the motor. The control device includes a return amount detector which is configured to detect a return amount of the belt reel in a drawing direction of the belt based on the rotational position of the belt reel detected by the position detector after the belt is wound around the belt reel and then the clutch disconnects the motor and the belt reel.

According to further aspect of the present invention, a method for controlling a vehicle seatbelt includes detecting a rotational position of a belt reel around which a belt is wound. A motor is provided to rotate the belt reel. A clutch is provided to connect or disconnect the motor and the belt reel. The clutch and a current supplied to the motor are controlled. A return amount of the belt reel in a drawing direction of the belt is detected based on the rotational position of the belt reel after the belt is wound around the belt reel and then the clutch disconnects the motor and the belt reel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 13A and 13B are flowcharts showing emergency wind-up control processing of FIG. 8.

DESCRIPTION OF THE EMBODIMENT

Figure 1:
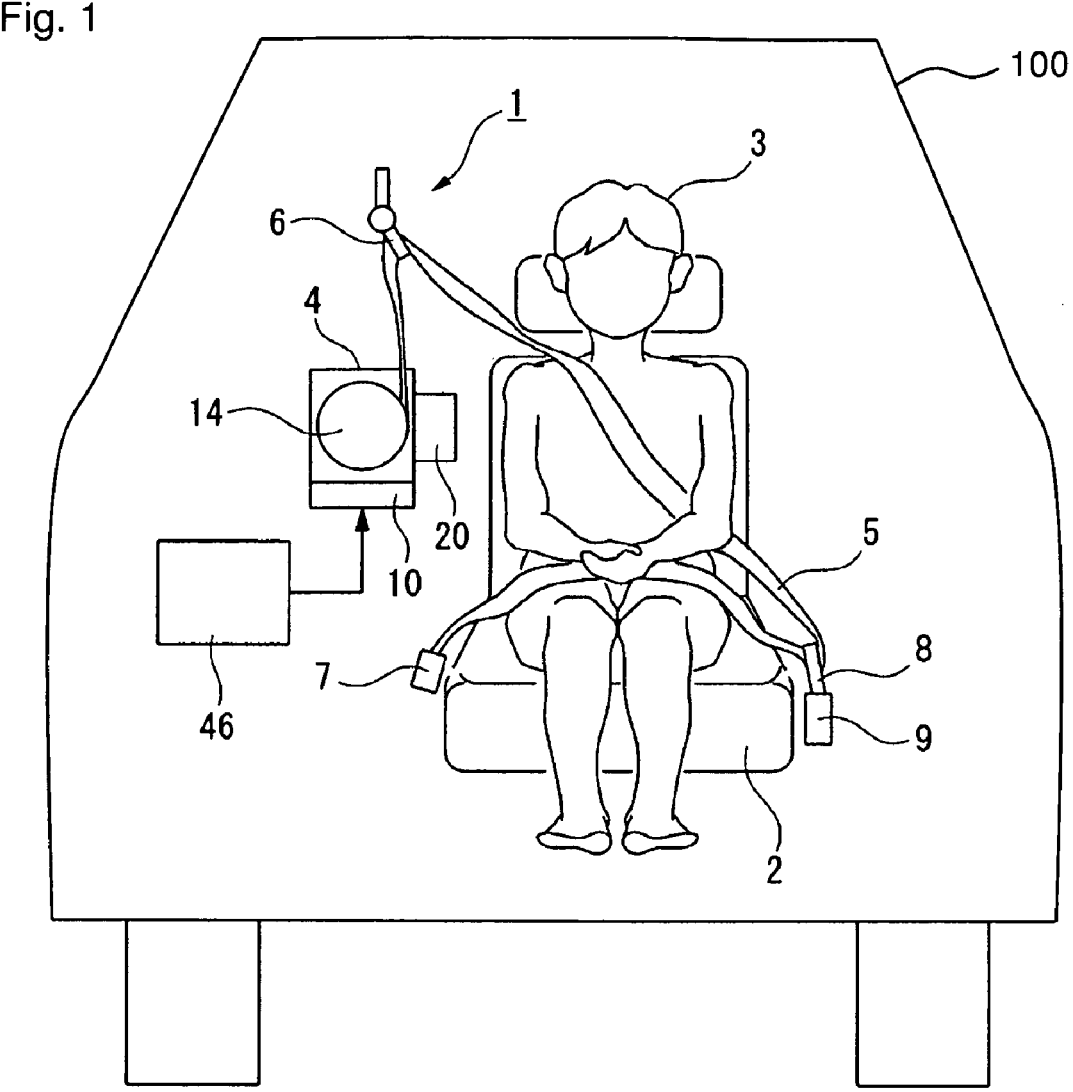
FIG. 1 is a schematic diagram showing a configuration of a vehicle seatbelt apparatus according to an embodiment of the present invention.

Embodiments will now be described with reference to the accompanying drawings, wherein like reference numerals designate corresponding or identical elements throughout the various drawings.

A vehicle seatbelt apparatus according to an embodiment of the present invention will be described with reference to the accompanying drawings. For example, as shown in FIG. 1, a vehicle seatbelt apparatus 1 of the present embodiment is a so-called three-point seatbelt apparatus which can constrain a passenger 3 seated on a seat 2 in a vehicle 100. A belt 5 is drawn upward in a substantially vertical direction from a retractor 4 attached to a center pillar (not shown), the belt 5 is inserted in a through anchor 6 supported on an upper side of the center pillar, and a leading end of the belt 5 is fixed to a vehicle body floor through an outer anchor 7 located closer to the exterior side of a compartment in relation to the seat 2. A tongue plate 8 is inserted between the through anchor 6 and the outer anchor 7 of the belt 5, and the tongue plate 8 is detachably attached to a buckle 9 which is fixed to the vehicle body floor located closer to the interior side of vehicle body in relation to the seat 2.

Figure 2:
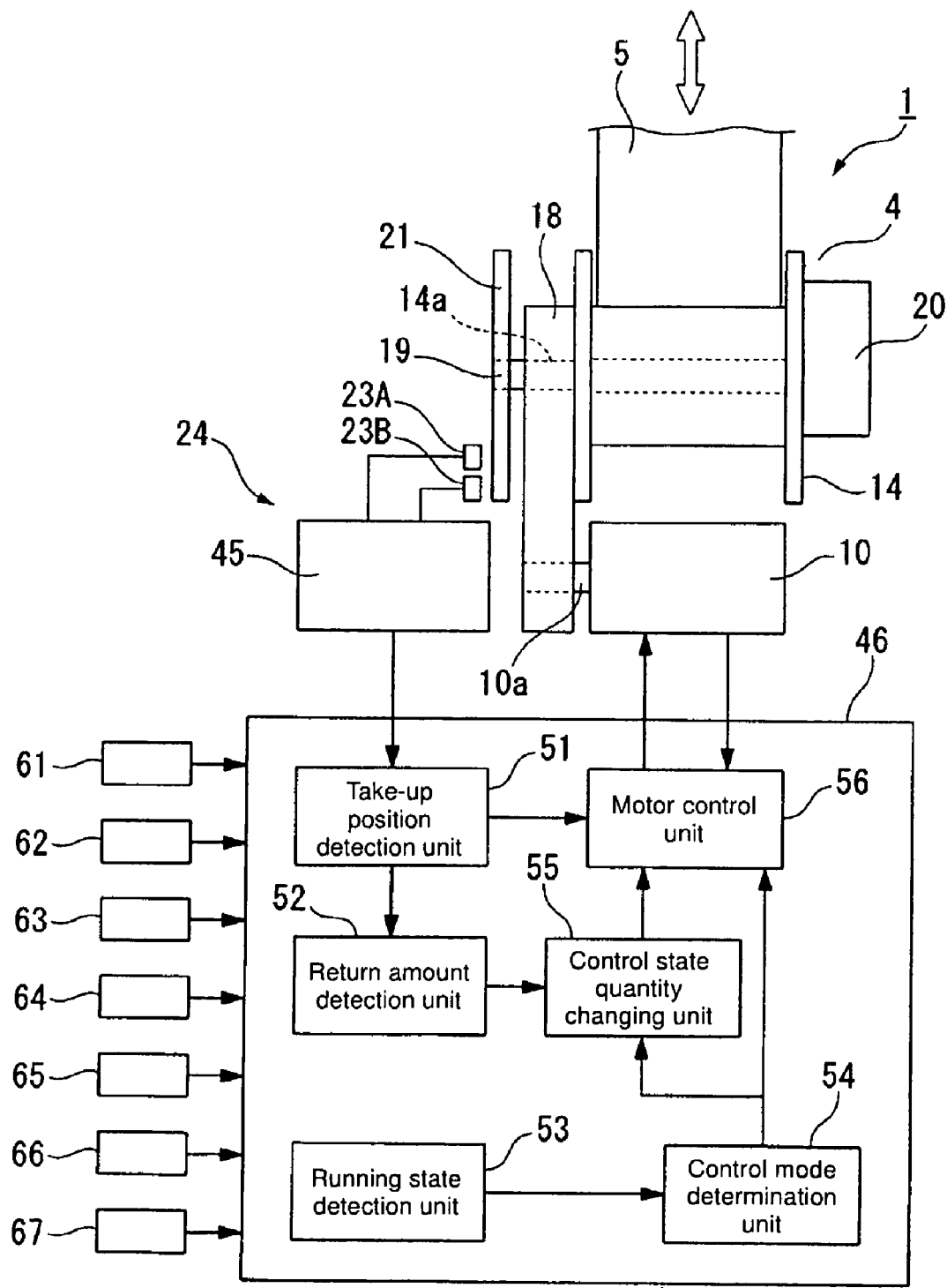
FIG. 2 is a schematic diagram showing a configuration of the vehicle seatbelt apparatus of the embodiment of the present invention.
Figure 3:
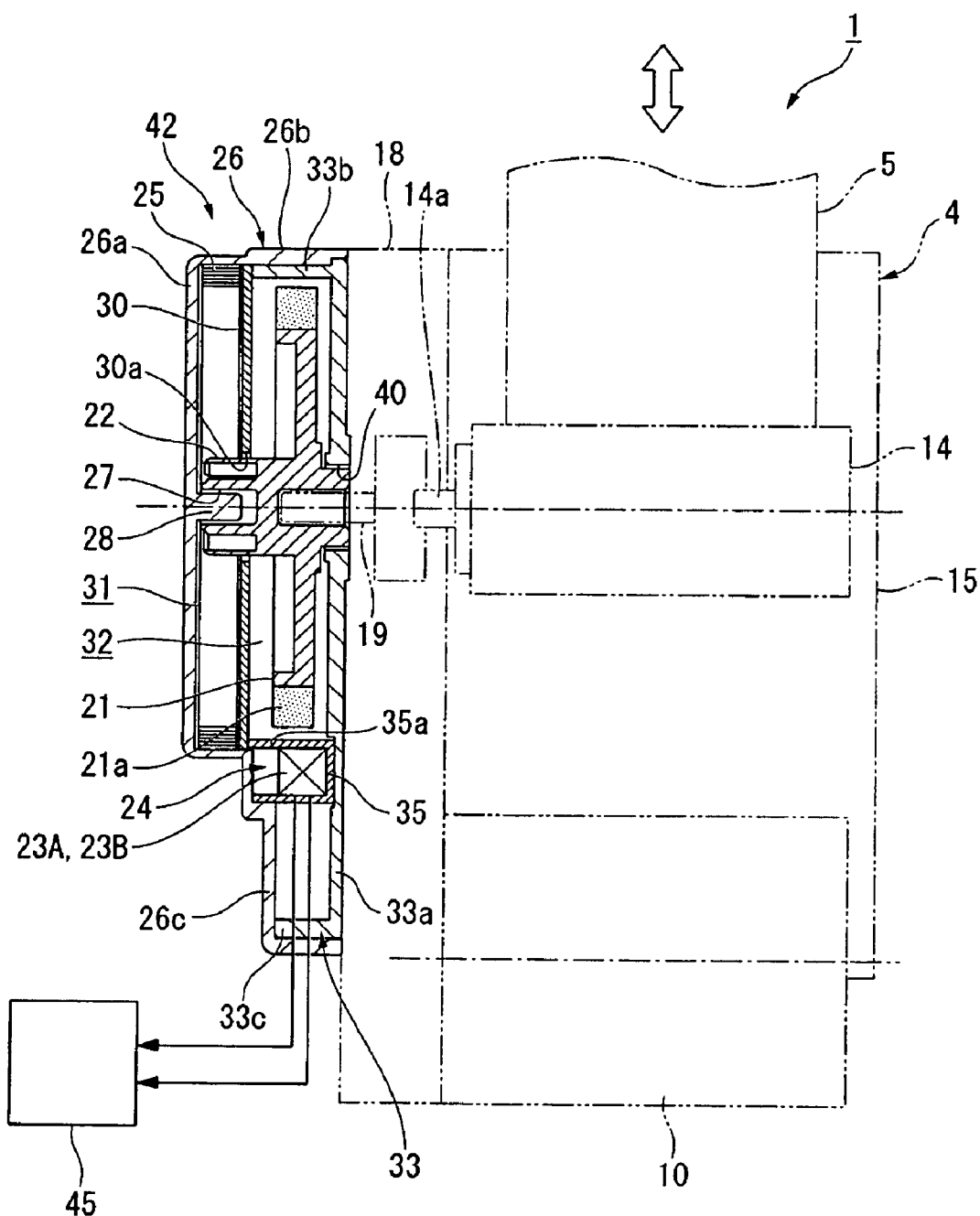
FIG. 3 is a longitudinal cross-sectional view showing a main part of a retractor of the embodiment of the present invention.
Figure 4:
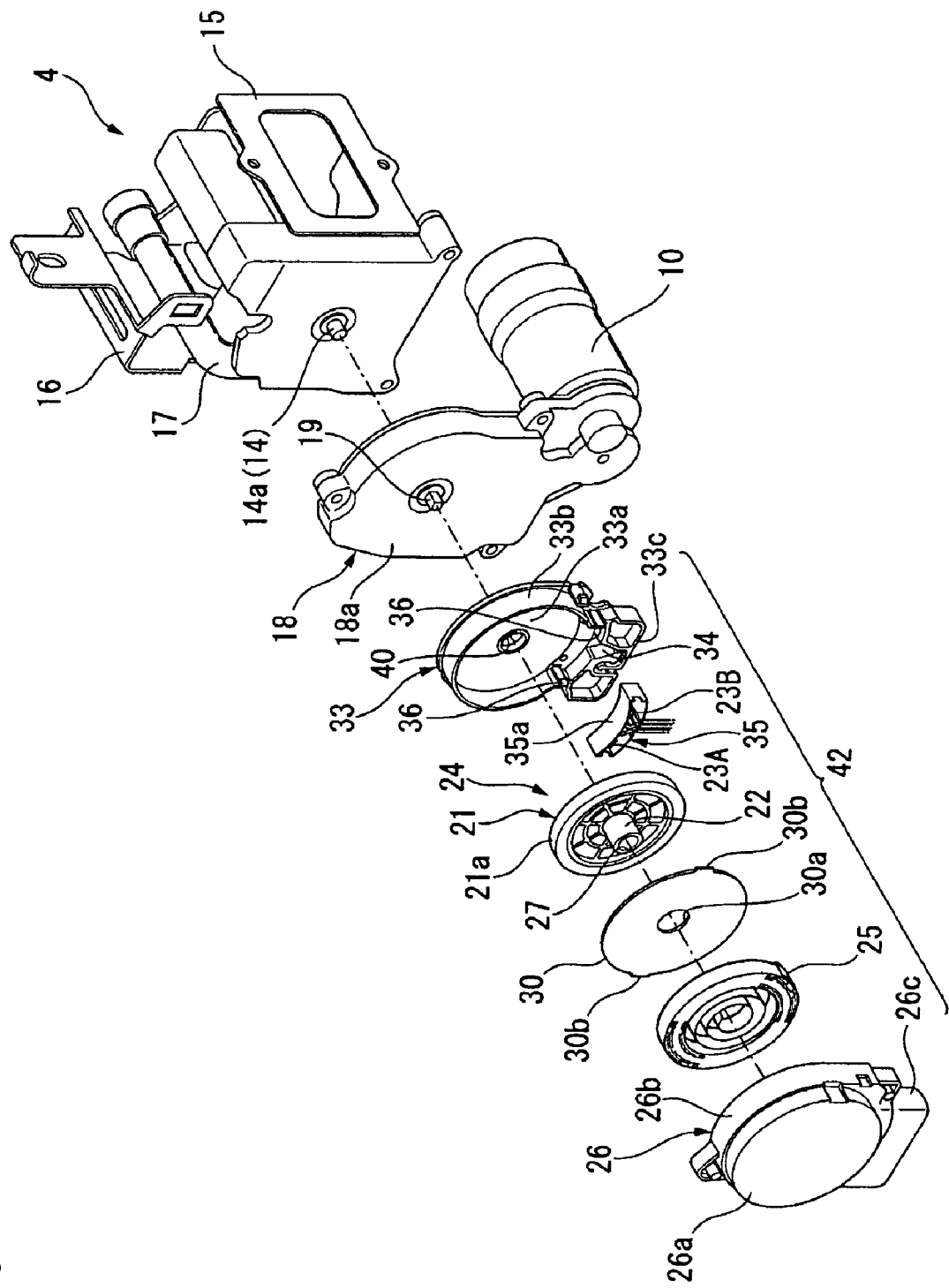
FIG. 4 is an exploded perspective view showing the retractor of the embodiment of the present invention.
Figure 5:
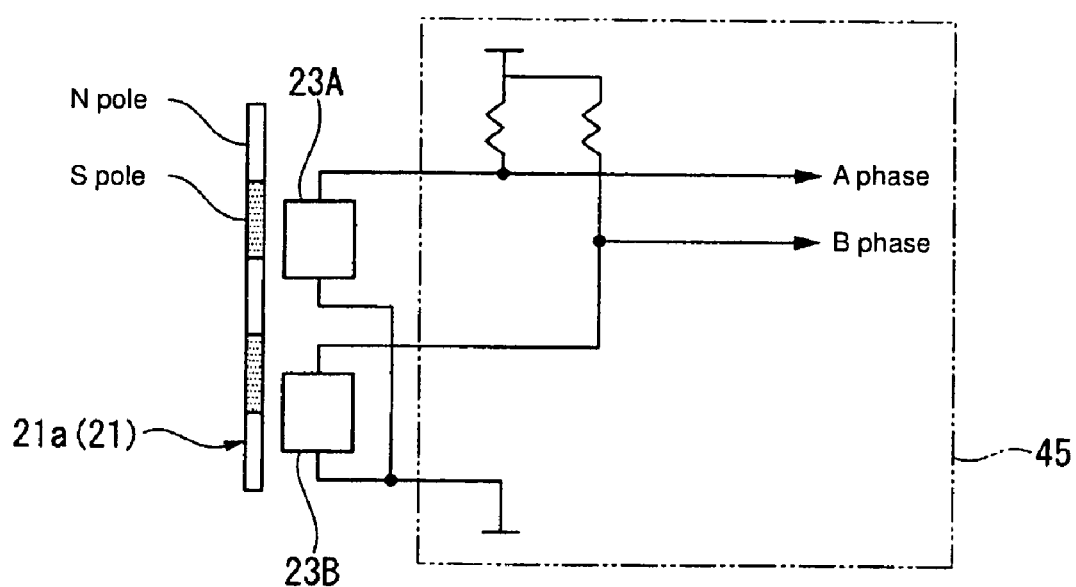
FIG. 5 is a schematic diagram showing a configuration of a rotation detection device of the embodiment of the present invention.

For example, as shown in FIGS. 2 to 4, in the retractor 4, a belt reel 14 around which the belt 5 is wound is rotatably supported by a retractor frame 15, and a shaft 14a of the belt reel 14 is projected outward (for example, frontward) from the retractor frame 15. The belt 5 is wound up around the retractor 4 in an initial state (for example, unused state), the belt 5 is drawn out from the belt reel 14 by the passenger 3 while guided by a belt guide portion 16, and the tongue plate 8 is fitted in and fixed to the buckle 9 to constrain the body (for example, a shoulder or the waste) of the passenger 3 within the seat 2. In the vehicle seatbelt apparatus 1, during, e.g., detection of collision impact or rollover, the taking up of the belt 5 is performed by a drive force of a motor 10 which imparts a torque to the belt reel 14 and a thrust force of an explosive of an explosive-type pretensioner mechanism 17.

The shaft 14a of the belt reel 14 is connected to a rotation shaft 10a of the motor 10 with a power transmission mechanism 18 interposed therebetween, so that the shaft 14a can be operated simultaneously with the rotation shaft 10a. The power transmission mechanism 18 includes a clutch and a gear mechanism (not shown) which connect and disconnect the power. An output shaft 19 which is coaxially coupled to the shaft 14a of the belt reel 14 is provided in the power transmission mechanism 18, and the output shaft 19 is projected forward. The clutch in the power transmission mechanism 18 is controlled by a processing device 46 to be described later, and the clutch can block the connection between the motor 10 and the output shaft 19 and belt reel 14 according to a rotation state of the motor 10.

For example, when the motor 10 is rotated in a forward rotation direction (that is, a direction in which the belt reel 14 is rotated forward while the belt 5 is drawn), the clutch connects the motor 10 and the output shaft 19 and belt reel 14. On the other hand, when the motor 10 is rotated in a backward rotation direction (that is, a direction in which the belt reel 14 is rotated backward while the belt 5 is delivered), the clutch blocks the connection between the motor 10 and the output shaft 19 and belt reel 14. However, even in the backward rotation state of the motor 10, the clutch maintains the connection between the motor 10 and the output shaft 19 and belt reel 14 when an external force (for example, a rotation drive force associated with a passenger's manipulation for drawing the belt 5) which is larger than the drive force in the backward rotation direction of the motor 10 acts in the backward rotation direction of the motor 10, and the clutch blocks the connection between the motor 10 and the output shaft 19 and belt reel 14 when the external force becomes smaller than the drive force in the backward rotation direction of the motor 10.

The retractor 4 includes an emergency lock mechanism 20 which mechanically locks the delivery of the belt 5 when a deceleration exceeding a predetermined value acts on the vehicle.

A disc-shape magnetic rotor 21 including a magnetic ring 21a is coupled to an outer periphery in a front end portion of the output shaft 19, and a connecting shaft 22 fixed to a shaft center position of the magnetic rotor 21 is projected forward. The magnetic ring 21a is magnetized such that different magnetic poles mutually emerge in a circumferential direction, and the magnetism depends on a position in the circumferential direction. Paired Hall elements 23A and 23B are disposed on an outer peripheral side of the magnetic rotor 21 while separated from each other in the circumferential direction and are brought close to each other in a non-contact state. The magnetic rotor 21 and the Hall elements 23A and 23B constitute a rotation detection device 24 which detects the rotation state of the belt reel 14.

A wind-up spring 25 is connected to the connecting shaft 22 which is integral with the magnetic rotor 21 to rotate and bias the belt reel 14 in the wind-up direction of the belt 5. For example, the wind-up spring 25 is a spiral spring. An inner peripheral end of the wind-up spring 25 is connected to the connecting shaft 22 while an outer peripheral end of the wind-up spring 25 is connected to an inner wall of a front cover 26 of the retractor 4. The front cover 26 is integrally connected to the retractor frame 15. A shaft center hole 27 is made in the leading end portion of the connecting shaft 22, and a guide projection 28 projected from the front cover 26 is inserted in the shaft center hole 27. A tension generated by the wind-up spring 25 is applied to the belt 5 while the belt reel 14 and the motor 10 are separated by the blocking operation of the clutch. In stopping the motor 10 while the belt reel 14 and the motor 10 are connected by the clutch, the connection between the motor 10 and the belt reel 14 through the clutch is released when the belt reel 14 is rotated in the wind-up direction of the belt by the elasticity of the wind-up spring 25.

The front cover 26 includes a based cylindrical spring containing portion 26a, a large-diameter cylindrical portion 26b, and a substantially rectangular sensor containing portion 26c. The wind-up spring 25 is contained in the spring containing portion 26a. The large-diameter cylindrical portion 26b is formed coaxial with the spring containing portion 26a, and the diameter of the large-diameter cylindrical portion 26b is larger than that of the spring containing portion 26a. The sensor containing portion 26c is continuously provided at a lower end of the large-diameter cylindrical portion 26b. The magnetic rotor 21 of the rotation detection device 24 is contained in the large-diameter cylindrical portion 26b, and a board (not shown) on which the Hall elements 23A and 23B are mounted is contained in the sensor containing portion 26c.

A substantially disc-shape partition 30 is disposed between the spring containing portion 26a and the large-diameter cylindrical portion 26b of the front cover 26 and has a through-hole 30a in which the connecting shaft 22 is inserted. The inside of the front cover 26 is partitioned into a spring containing space 31 on a bottom portion side and a rotor containing space 32 on an opening side by the partition 30. A pair of support projections 30b is made in an outer peripheral edge portion of the partition 30 to be fitted in positioning grooves (not shown) in a circumferential wall of the large-diameter cylindrical portion 26b. The positioning grooves are formed so as to reach a border position between the spring containing portion 26a and the large-diameter cylindrical portion 26b, and the support projections 30b abut on terminal portions of the positioning grooves to locate the partition 30 in the front cover 26.

A sub-cover 33 which is smaller than the front cover 26 is fitted in the front cover 26 in a covering manner after the wind-up spring 25, the partition 30, the magnetic rotor 21, and the like are contained in the front cover 26. The spring containing space 31 is filled with a lubricant to lubricate the wind-up spring 25. The sub-cover 33 is fixed to the front cover 26 with a screw. An opening 40 is provided in a bottom wall 33a of the sub-cover 33 in order to couple the output shaft 19 of the power transmission mechanism 18 to the magnetic rotor 21.

The sub-cover 33 includes a substantially cylindrical arc wall 33b and a rectangular wall 33c. The arc wall 33b is fitted in the large-diameter cylindrical portion 26b of the front cover 26. The rectangular wall 33c is continuously provided at both end portions of the arc wall 33b and fitted in the sensor containing portion 26c of the front cover 26. A sensor placement space 34 is secured inside the rectangular wall 33c, and the board mounted with the Hall elements 23A and 23B is disposed in the sensor placement space 34. The board is retained in a retention case 35, and the retention case 35 is disposed in the sensor placement space 34 of the sub-cover 33 and is latched by latch pawls 36 projected from the sub-cover 33.

In the retention case 35, the side facing the bottom portion of the front cover 26 is opened, and an arc wall 35a facing the outer peripheral edge portion of the magnetic rotor 21 constitutes a circular wall along with the arc wall 33b of the sub-cover 33 in the state in which the retention case 35 is assembled in the front cover 26. The leading end surfaces of the arc walls 33b and 35a abut on the outer peripheral edge portion of the partition 30 from the side of the rotor containing space 32 while the sub-cover 33 is fitted in and fixed to the front cover 26.

The wind-up spring 25, the partition 30, the magnetic rotor 21, and the like are contained in the front cover 26, and the sub-cover 33 is attached onto the opening side of the front cover 26 together with the retention case 35, thereby constituting a cover unit 42 which is integrally connected to the power transmission mechanism 18 and the retractor frame 15 with bolts and the like.

The pair of Hall elements 23A and 23B of the rotation detection device 24 is connected to the processing device 46 through a signal processing sensor circuit 45. The sensor circuit 45 performs predetermined processing on a pulse signal which is detected according to a change in magnetic field by each of the Hall elements 13A and 13B, and the pulse signal is fed into the processing device 46. The pulse signals having an A phase and a B phase are supplied from the Hall elements 23A and 23B to the processing device 46, respectively. The pulse signals are used as, e.g., feedback signals for driving the motor 10 in the processing device 46. The processing device 46 detects a rotation amount (that is, a drawing amount of the belt 5) of the belt reel 14, e.g., by counting the pulse signal of each of the A phase and B phase and detects a rotation direction of the belt reel 14 by a comparison of a rising edge of a waveform between two pulse signals having the A phase and B phase.

Figure 6:
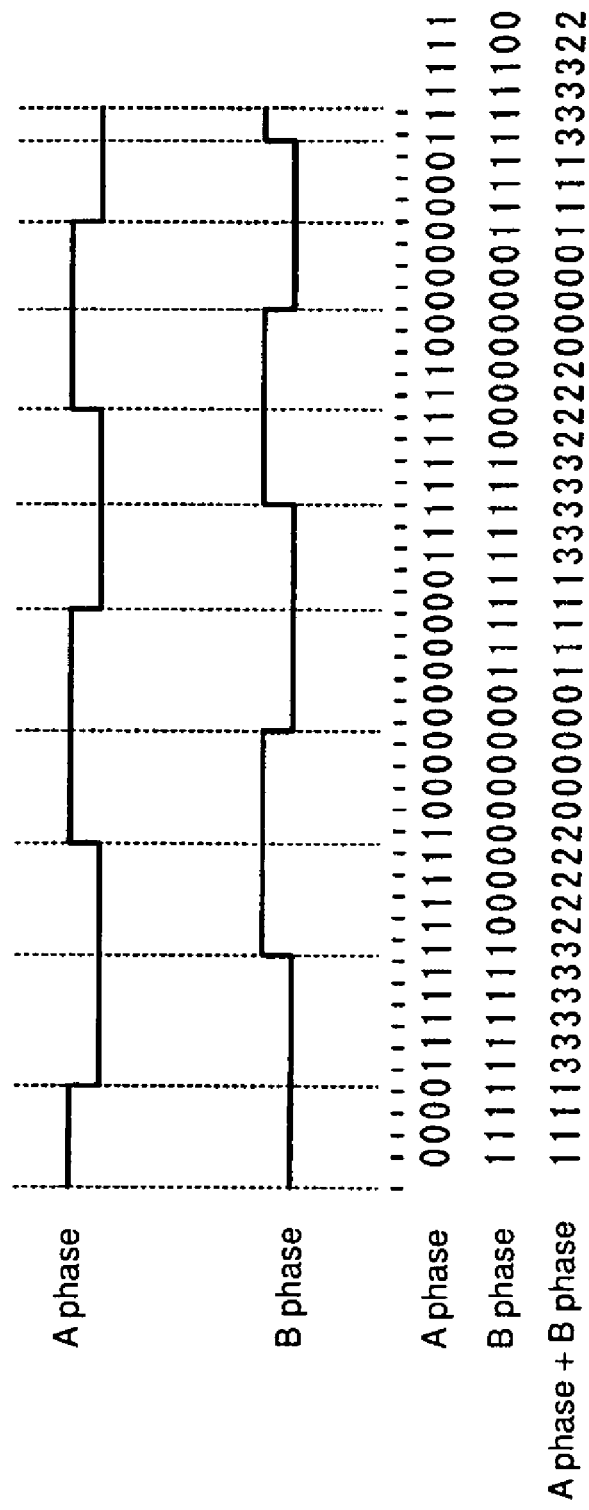
FIG. 6 shows pulse signal waveforms of an A phase and a B phase which are supplied from Hall elements of the rotation detection device of the embodiment of the present invention, digitized signal levels of the phases, and a numerical number obtained by adding the digitized values of the phases.

For example, "0" corresponds to a high value of each of the pulse signals having the A phase and B phase supplied from the Hall elements 23A and 23B while "1" corresponds to a low value of each pulse signal, and it is assumed that values corresponding to the A phase and B phase are expressed by binary numbers and the value corresponding to the A phase is larger than the value corresponding to the B phase by one digit. A value in which the values corresponding to the A phase and B phase are added and converted into a decimal number (hereinafter simply referred to as "a sum of A phase and B phase") is changed as shown in FIG. 6. For example, assuming that pulse waveforms of the A phase and B phase shown in FIG. 6 are obtained when the belt reel 14 is rotated forward, the sum of A phase and B phase shows a predetermined first change ( . . . 3→2→0→1 . . . ). When the belt reel 14 is rotated backward, the sum of A phase and B phase shows a predetermined second change ( . . . 3→1→0→2 . . . ). Therefore, a determination of an abnormal state can be made when changes except for the predetermined first and second changes are detected.

Assuming that "+1" is a count value of one change (previous value-present value) of the sum of A phase and B phase when the sum of A phase and B phase shows the predetermined first change ( . . . 3→2→0→1 . . . ) and "−1" is a count value of one change (previous value-present value) of the sum of A phase and B phase when the sum of A phase and B phase shows the predetermined second change ( . . . 3→1→0→2 . . . ), a total count value (cnt) of the pulse corresponding to the wind-up amount of the belt 5 obtained by counting the count value of the change in sum of A phase and B phase is changed as shown in Table 1 during the rotation of the belt reel 14. The correlation between the change (previous value-present value) in sum of A phase and B phase and the count value is changed as shown in Table 2. In Table 2, "+1" indicates the forward rotation of the belt reel 14, "−1" indicates the backward rotation of the belt reel 14, "0" indicates that the sum of A phase and B phase is not changed, and "x" indicates the abnormal state which is neither the forward rotation nor the backward rotation.

TABLE 1

| A phase + B phase | 111133333322222200000111111 |
|---|---|
| Previous value − present value | 00001000001000000100000100000 |
| Cnt | 000011111122222223333344444 |

TABLE 2

| | Present value | | | |
|---|---|---|---|---|
| Previous value | 0 | 1 | 2 | 3 |
| 0 | 0 | 1 | −1 | x |
| 1 | −1 | 0 | x | 1 |
| 2 | 1 | x | 0 | −1 |
| 3 | x | −1 | 1 | 0 |

In the vehicle seatbelt apparatus 1, the motor 10 is stopped while the passenger uses the belt 5 or while the vehicle is in a normal running state, and the drive of the motor 10 is started to take up the belt 5 to a predetermined containing position when an unused state of the belt 5 is detected through the release of the buckle 9 and the like. At this point, the rotation detection device 24 detects the wind-up amount (or the drawing amount), moving direction, or the like of the belt 5, and the motor 10 is driven and controlled based on the detection result of the rotation detection device 24.

The processing device 46 includes a wind-up position detection unit 51, a return amount detection unit 52, a running state detection unit 53, a control mode determination unit 54, a control state quantity changing unit 55, and a motor control unit 56. Various signals are fed into the processing device 46. That is, for example, a buckle switch (buckle SW) 61 which detects the presence or absence of the tongue plate 8 fitted in and fixed to the buckle 9 supplies a detection signal to the processing device 46. An external field sensor 62, which is formed by a radar or a camera to detect an object existing in an outer field of the vehicle, supplies a detection signal to the processing device 46. An acceleration sensor 63 which detects the acceleration or deceleration of the vehicle supplies a detection signal to the processing device 46. A yaw rate sensor 64 which detects a vehicle raw rate supplies a detection signal to the processing device 46. A speed sensor 65 which detects a vehicle speed supplies a detection signal to the processing device 46. A temperature sensor 66 which is disposed on a board (not shown) of the processing device 46 to detect a temperature supplies a detection signal to the processing device 46. A current sensor 67 which detects a current passed through the motor 10 supplies a detection signal to the processing device 46. The pulse signals of the A phase and B phase are also supplied to the processing device 46. The pulse signals are supplied from the pair of Hall elements 23A and 23B, and predetermined processing is performed on the pulse signals by the sensor circuit 45.

The wind-up position detection unit 51 computes a rotational position of a belt reel 12 from each of the pulse signals of the A phase and B phase supplied from the rotation detection device 24, and the rotational position is set as a wind-up position. As used herein, the rotational position (wind-up position) of the belt reel 12 shall mean a value which is increased by the forward rotation of the belt reel 12, that is, by the taken-up amount of the belt 5 increased by the belt reel 12, for example, when the state in which the taken-up amount of the belt 5 becomes zero (that is, the drawing amount is a predetermined maximum amount) by the belt reel 12 is set at an origin (zero) while the forward rotation direction of the belt reel 12 is set in a positive direction.

The return amount detection unit 52 measures a return amount in the drawing direction of the belt reel 12 based on the rotational position of the belt reel 12 supplied from the wind-up position detection unit 51, when the clutch of the power transmission mechanism 18 releases the connection between the motor 10 and the output shaft 19 and belt reel 14 after the motor 10 is driven with a predetermined current-carrying amount.

Figure 7A:
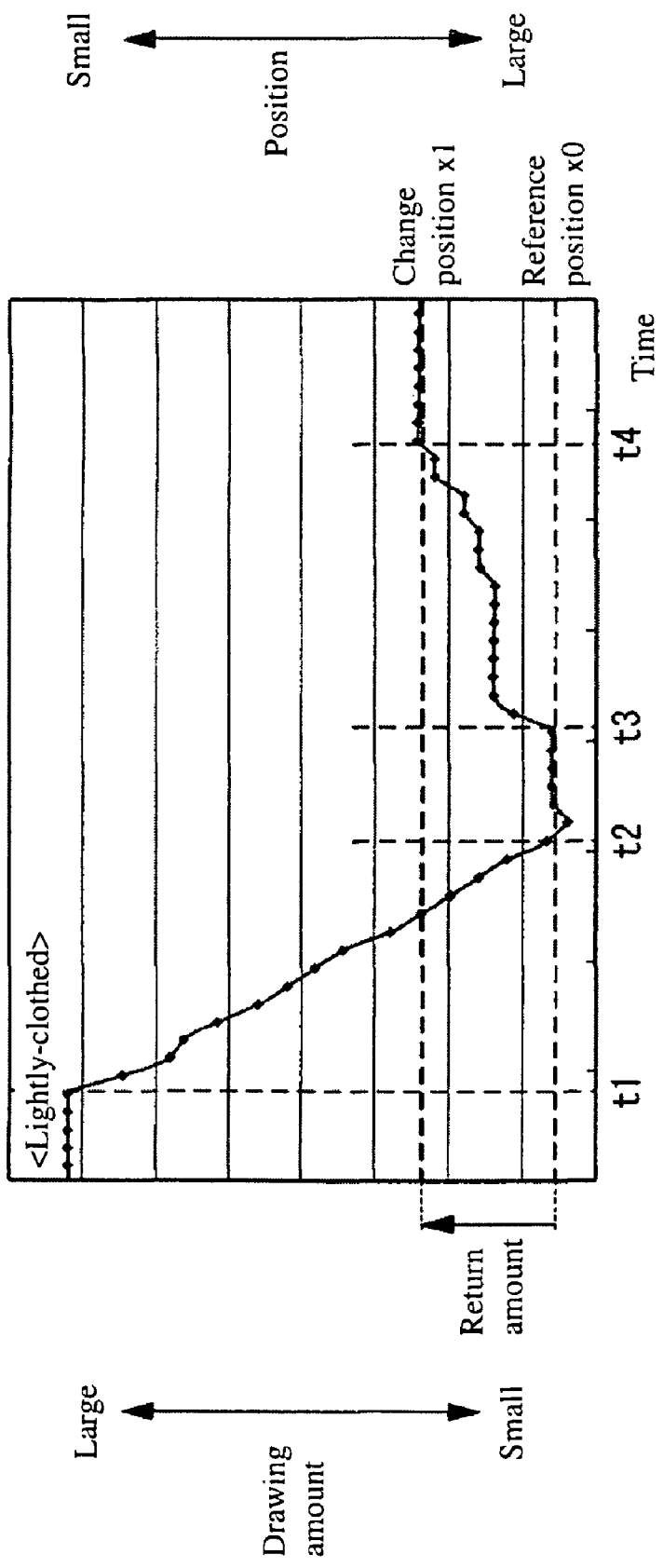
FIGS. 7A and 7B are graphs showing changes in drawing amount of a belt used for relatively lightly-clothed and heavily-clothed passengers, according to the embodiment of the present invention.
Figure 7B:
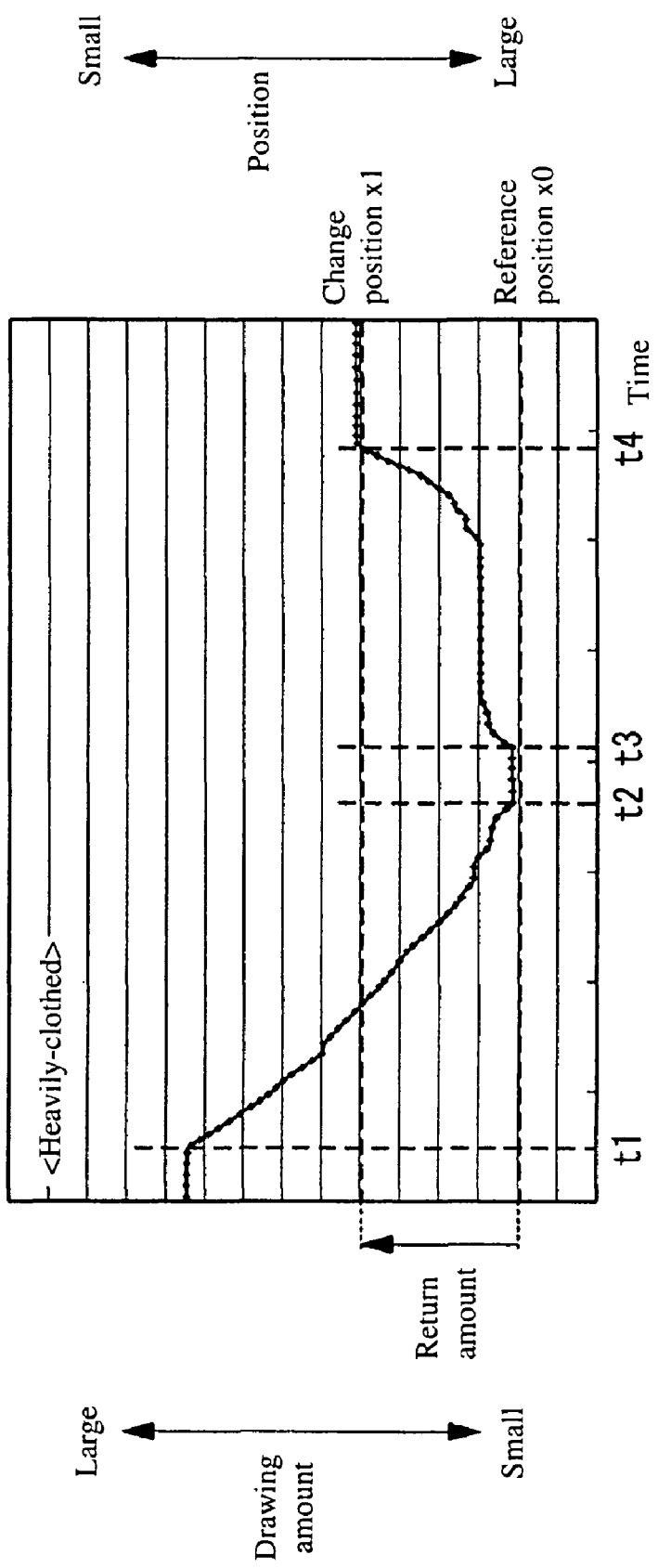

As shown in FIGS. 7A and 7B, in fitting and fixing the tongue plate 8 in and to the buckle 9 to put the belt 5 on the relatively lightly-clothed or heavily-clothed passenger, when the motor control unit 56 starts the current conduction to the motor 10 with a predetermined current I0, the belt reel 12 starts taking up the belt 5, and the rotational position of the belt reel 12 is changed to an increasing trend at time t1 and onwards. While the conduction of the motor 10 with the predetermined current I0 is continued, the increase in taken-up amount of the belt 5 by the belt reel 12 is stopped so as not to substantially change the rotational position of the belt reel 12, e.g., between time t2 and time t3. At this point, the return amount detection unit 52 stores the rotational position of the belt reel 12 as a reference position X0. The motor control unit 56 rotates the motor 10 in the backward rotation direction to cause the clutch in the power transmission mechanism 18 to block the connection between the motor 10 and the output shaft 19 and belt reel 14. Therefore, the belt reel 14 can be rotated irrespective of the motor 10, and as shown after time t3 and onwards, the belt reel 14 is rotated in the drawing direction of the belt 5 following the passenger body or in response to elasticity of the clothing, and the drawing of the belt 5 from the belt reel 12 is started so as to change the rotational position of the belt reel 12 into a decreasing trend. While the clutch in the power transmission mechanism 18 continues to block the connection between the motor 10 and the output shaft 19 and belt reel 14, as shown, e.g., after time t4 and onwards, the increase in amount of the belt 5 drawn from the belt reel 12 is stopped and the rotational position of the belt reel 12 is not substantially changed. At this point, the return amount detection unit 52 stores the rotational position of the belt reel 12 as a change position X1. The return amount detection unit 52 sets a value (X0-X1) obtained by subtracting the change position X1 from the reference position X0 as a return amount of the belt 5.

The running state detection unit 53 detects a predetermined running state of the vehicle based on the detection signals supplied from the various sensors 63, 64, and 65 which detect a vehicle running state quantity and the detection signal supplied from the external field sensor 62. Examples of the predetermined running state of the vehicle include a control state in which a rapid change in vehicle running behavior is prevented by performing drive control on the brake device or a slip of a driving wheel is prevented on a slippery road and the like, a state in which an excessive lateral acceleration is generated in running a curve or a side slip such as over-steering and under-steering is generated, and a state in which collision or contact with the object existing in the external field of the vehicle is generated.

The control mode determination unit 54 selects, e.g., one of a constant current control mode, a position retaining control mode, and an emergency wind-up control mode as a control mode of the motor 10 according to the detection result of the vehicle running state supplied from the running state detection unit 53. The control mode determination unit 54 selects the constant current control mode in which the current-carrying amount of the motor 10 is maintained substantially at a predetermined current-carrying amount, when the vehicle running state is in the control state in which a rapid change in vehicle running behavior is prevented by performing the drive control over the brake device or the slip of the driving wheel is prevented on the slippery road and the like. The control mode determination unit 54 selects the position retaining control mode in which the current-carrying amount of the motor 10 is increased and decreased such that the rotational position of the belt reel 12 is maintained substantially at a predetermined rotational position, when the vehicle running state is in the state in which an excessive lateral acceleration is generated in running a curve or a side slip such as over-steering or under-steering is generated. For example, the control mode determination unit 54 selects the emergency wind-up control mode when the vehicle running state is in the state in which a collision or contact with an object existing in the external field of the vehicle is possibly generated. In the emergency wind-up control mode, the current-carrying amount of the motor 10 is set at a maximum current and is increased and decreased such that the rotational position of the belt reel 12 is maintained substantially at a predetermined wind-up position in the case where the rotational position of the belt reel 12 reaches a predetermined wind-up position.

The control state quantity changing unit 55 changes at least one of a control target and a control gain in the control mode of the motor 10, supplied from the control mode determination unit 54, according to the return amount supplied from the return amount detection unit 52.

The motor control unit 56 sets the drive or stop timing or a target current of the motor 10 to control energization of the motor 10 according to the rotational position of the belt reel 14 supplied from the wind-up position detection unit 51, the control mode of the motor 10 supplied from the control mode determination unit 54, and the control target and control gain supplied from the control state quantity changing unit 55.

The vehicle seatbelt apparatus 1 of the present embodiment has the above-described configuration. An operation of the vehicle seatbelt apparatus 1 will be described below. The following process in Steps S01 to S07 is repeatedly performed in a predetermined period, e.g., in the state where the tongue plate 8 is fitted in and fixed to the buckle 9.

Figure 8:
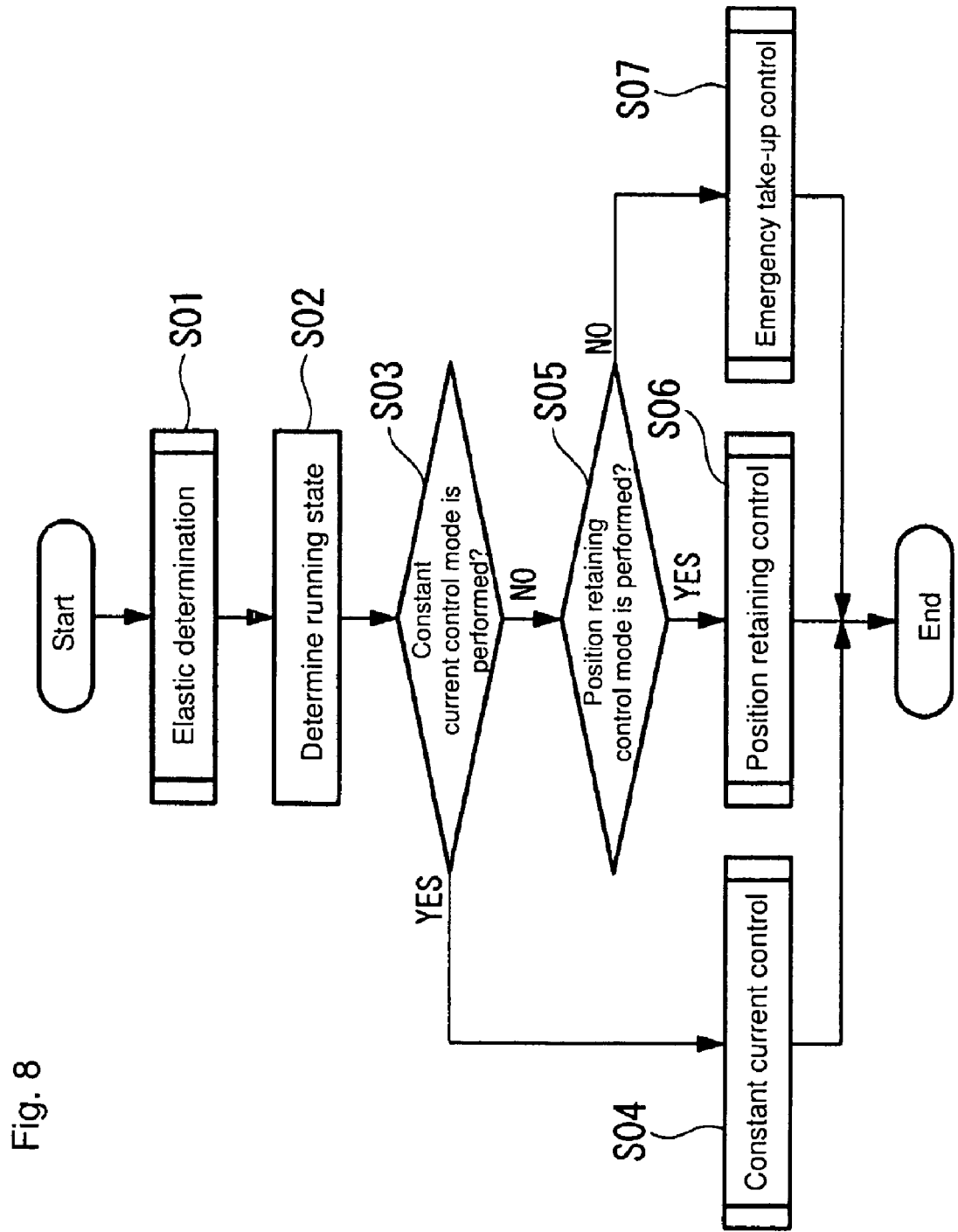
FIG. 8 is a flowchart showing an operation of the vehicle seatbelt apparatus of the embodiment of the present invention.

First, for example in Step S01 of FIG. 8, elastic determination processing, which will be described later, is performed. In Step S02, a predetermined running state of the vehicle is determined based on the detection signals supplied from the various sensors 63, 64, and 65 which detect a vehicle running state quantity and the detection signal supplied from the external field sensor 62. Examples of the predetermined running state of the vehicle include the state in which a rapid change in vehicle running behavior be prevented by performing the drive control over the brake device or the slip of the driving wheel be prevented on a slippery road and the like, the state in which an excessive lateral acceleration is generated in running, e.g., a curve or a side slip such as over-steering or under-steering is generated, and the state in which collision or contact with an object existing in the external field of the vehicle is possibly generated.

In Step S03, according to the determination result of the vehicle running state, it is determined whether or not the vehicle running state is, for example, in the control state in which a rapid change in vehicle running behavior be prevented by performing the drive control over the brake device or the slip of the driving wheel be prevented on a slippery road and the like, in which state the constant current control mode be performed as the control mode of the motor 10 where the current-carrying amount of the motor 10 is maintained substantially at a predetermined current-carrying amount. When the determination result is "YES" in Step S03, the flow goes to Step S04. In Step S04, constant current control processing, which will be described later, is performed, and the process is ended. On the other hand, when the determination result is "NO" in Step S03, the flow goes to Step S05.

In Step S05, according to the determination result of the vehicle running state, it is determined whether or not the vehicle running state is, e.g., the state in which an excessive lateral acceleration is generated in running a curve, or a side slip such as over-steering or under-steering is generated, in which state a position retaining control mode be performed as the control mode of the motor 10 where the current-carrying amount of the motor 10 is increased and decreased such that the rotational position of the belt reel 14 is maintained substantially at a predetermined rotational position. When the determination result is "YES" in Step S05, the flow goes to Step S06. In Step S06, position retaining control processing, which will be described later, is performed. Then the process is ended. On the other hand, when the determination result is "NO" in Step S05, the flow goes to Step S07. In Step S07, emergency wind-up control processing, which will be described later, is performed. Then the process is ended.

Figure 9A:
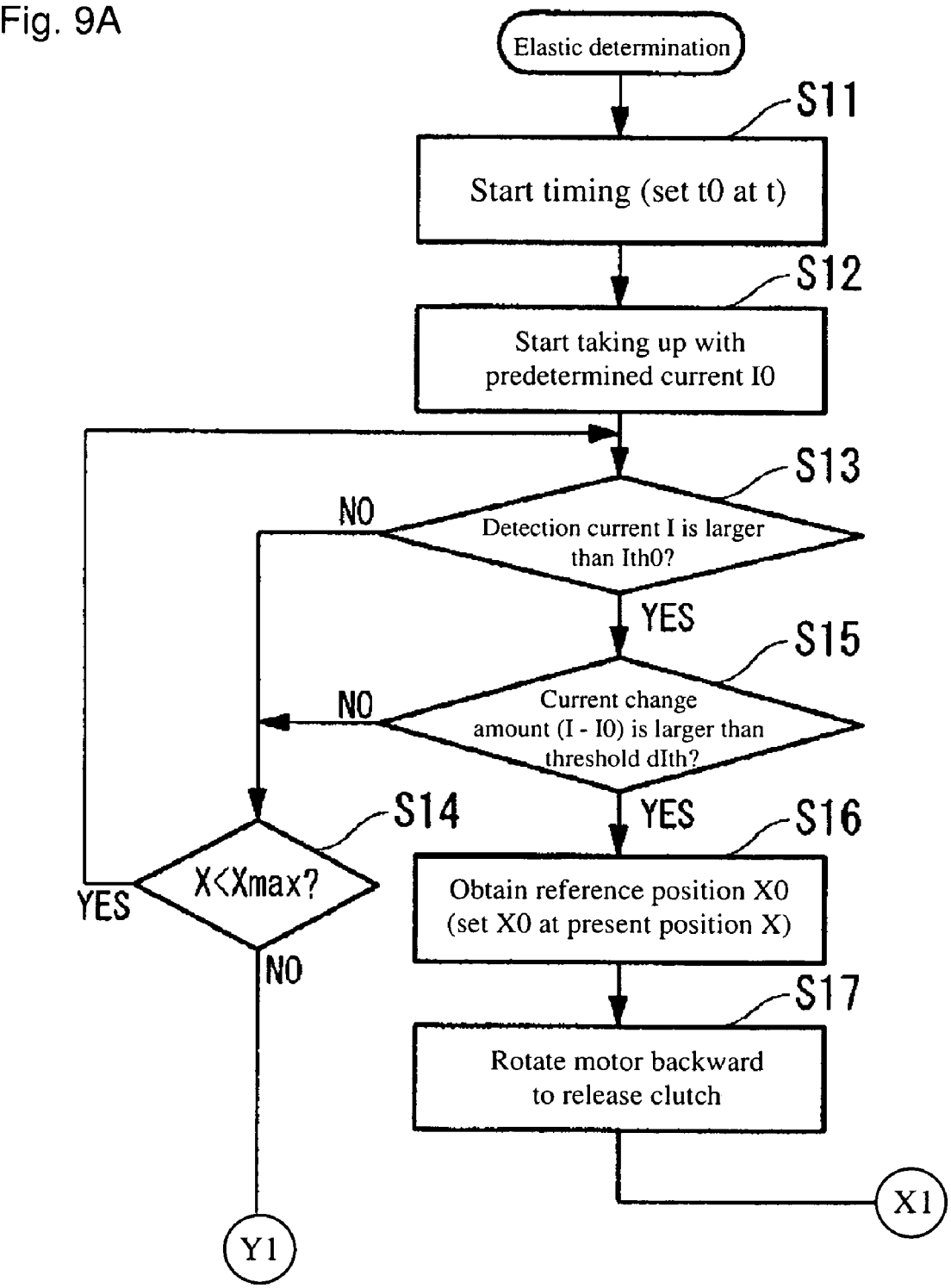
FIGS. 9A and 9B are flowcharts showing elastic determination processing of FIG. 8.
Figure 9B:
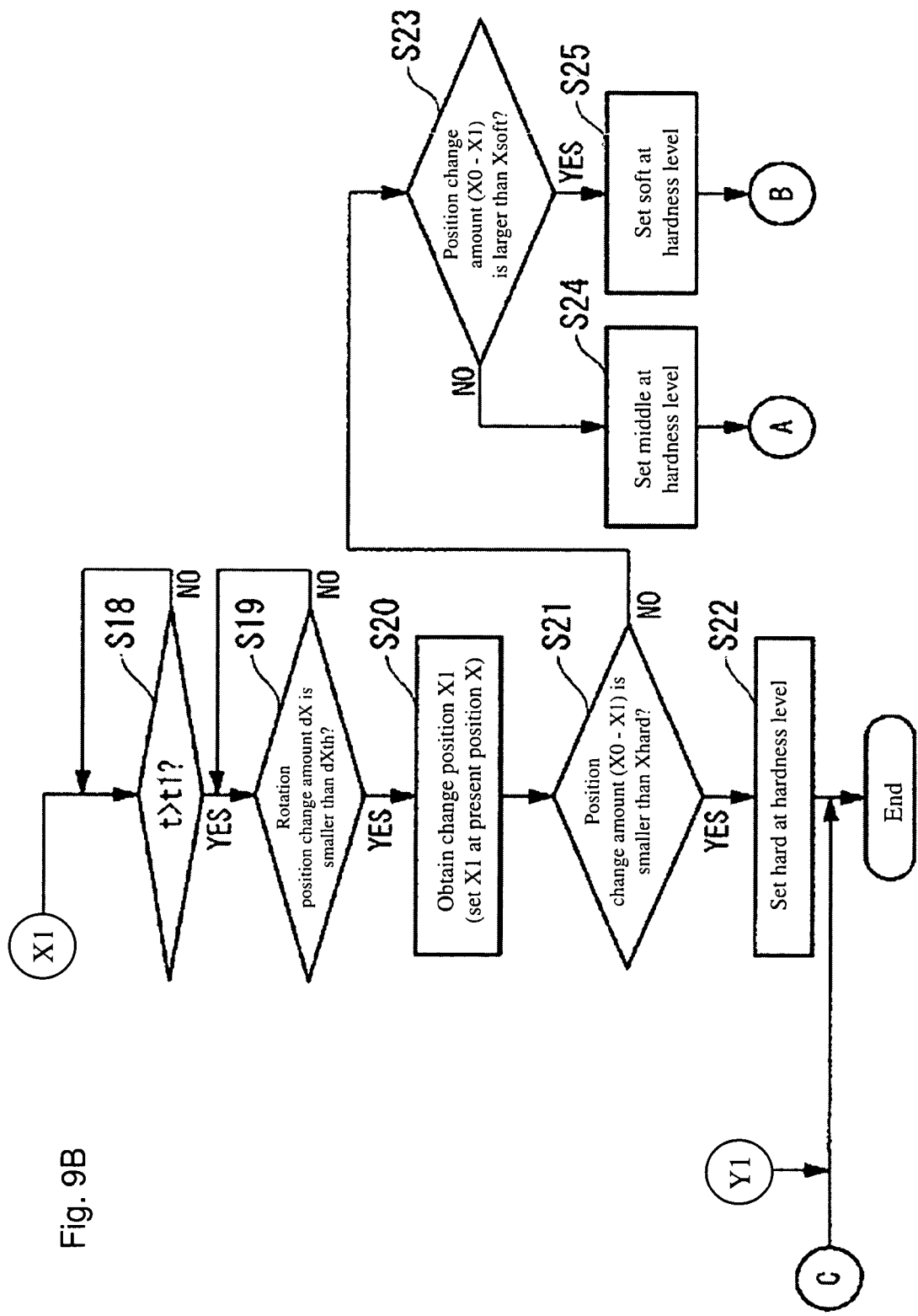

The elastic determination processing in Step S11 will be described below. First, for example in Step S11 of FIG. 9A, a timer is initialized by appropriately setting a predetermined initial value t0 to a timer value t of the timer, and measurement of timing is started with the timer. In Step S12, the energization of the motor 10 is started with a predetermined current I0 and the winding up of the belt 5 is started with the belt reel 14. In Step S13, it is determined whether or not a detection current I detected by the current sensor 67 is larger than a predetermined current threshold Ith0. When the determination result is "NO" in Step S13, the flow goes to Step S14. On the other hand, when the detection result is "YES" in Step S13, that is, when the current necessary to drive the motor 10 in the forward rotation direction is increased as a load on the winding up of the belt 5 by the belt reel 14 is increased, the flow goes to Step S15.

In Step S14, it is determined whether or not a present position X of the rotational position of the belt reel 14 is smaller than a maximum wind-up position Xmax corresponding to a predetermined maximum wind-up amount of the belt 5. When the determination result is "YES" in Step S14, the flow returns to Step S13. On the other hand, when the determination result is "NO" in Step S14, the processing is ended.

In Step S15, it is determined whether or not the current change amount (I-I0) obtained by subtracting the predetermined current I0 from the detection current I is larger than a predetermined current change threshold dIth. When the determination result is "NO" in Step S15, the flow goes to Step S14. On the other hand, when the determination result is "YES" in Step S15, that is, when the current necessary to drive the motor 10 in the forward rotation direction is increased as the load on the winding up of the belt 5 by the belt reel 14 is increased, the flow goes to Step S16.

In Step S16, the present position X of the rotational position of the belt reel 14, detected at this point, is set as a reference position X0. In Step S17, the motor 10 is rotated in the backward rotation direction and the connection between the motor 10 and the belt reel 14 by the clutch in the power transmission mechanism 18 is released. In Step S18, it is determined whether or not the timer value t of the timer at this time is larger than a predetermined time t1. When the determination result is "NO" in Step S18, the determination processing in Step S18 is repeatedly performed. On the other hand, when the determination result is "YES" in Step S18, the flow goes to Step S19.

In Step S19, it is determined whether or not the rotational position change amount dX from the rotational position of the belt reel 14 in the previous processing to the rotational position of the belt reel 14 in the present processing is smaller than a predetermined rotational position change amount threshold dXth. When the determination result is "NO" in Step S19, the determination processing in Step S19 is repeatedly performed. On the other hand, when the determination result is "YES" in Step S19, that is, when the rotational position of the belt reel 14 is not substantially changed while the belt reel 14 can be rotated irrespective of the motor 10, the flow goes to Step S20. In Step S20, the present position X of the rotational position of the belt reel 14, detected at this point, is set as the change position X1.

In Step S21, it is determined whether or not the position change amount (X0-X1) obtained by subtracting the change position X1 from the reference position X0 is smaller than a predetermined first hardness determination threshold Xhard. When the determination result is "YES" in Step S21, the flow goes to Step S22. In Step S22, "hard" is set to a hardness level constituting the elastic information, and the processing is ended. On the other hand, when the determination result is "NO" in Step S21, the flow goes to Step S23.

In Step S23, it is determined whether or not the position change amount (X0-X1) is larger than a predetermined second hardness determination threshold Xsoft (>Xhard) which is larger than, e.g., the predetermined first hardness determination threshold Xhard. When the determination result is "NO" in Step S23, the flow goes to Step S24. In Step S24, "middle" is set to the hardness level constituting the elastic information, and the flow goes to Step S31 to be described later. On the other hand, when the determination result is "YES" in Step S23, the flow goes to Step S25. In Step S25, "soft" is set to the hardness level constituting the elastic information, and the flow goes to Step S41 to be described later.

Figure 10A:
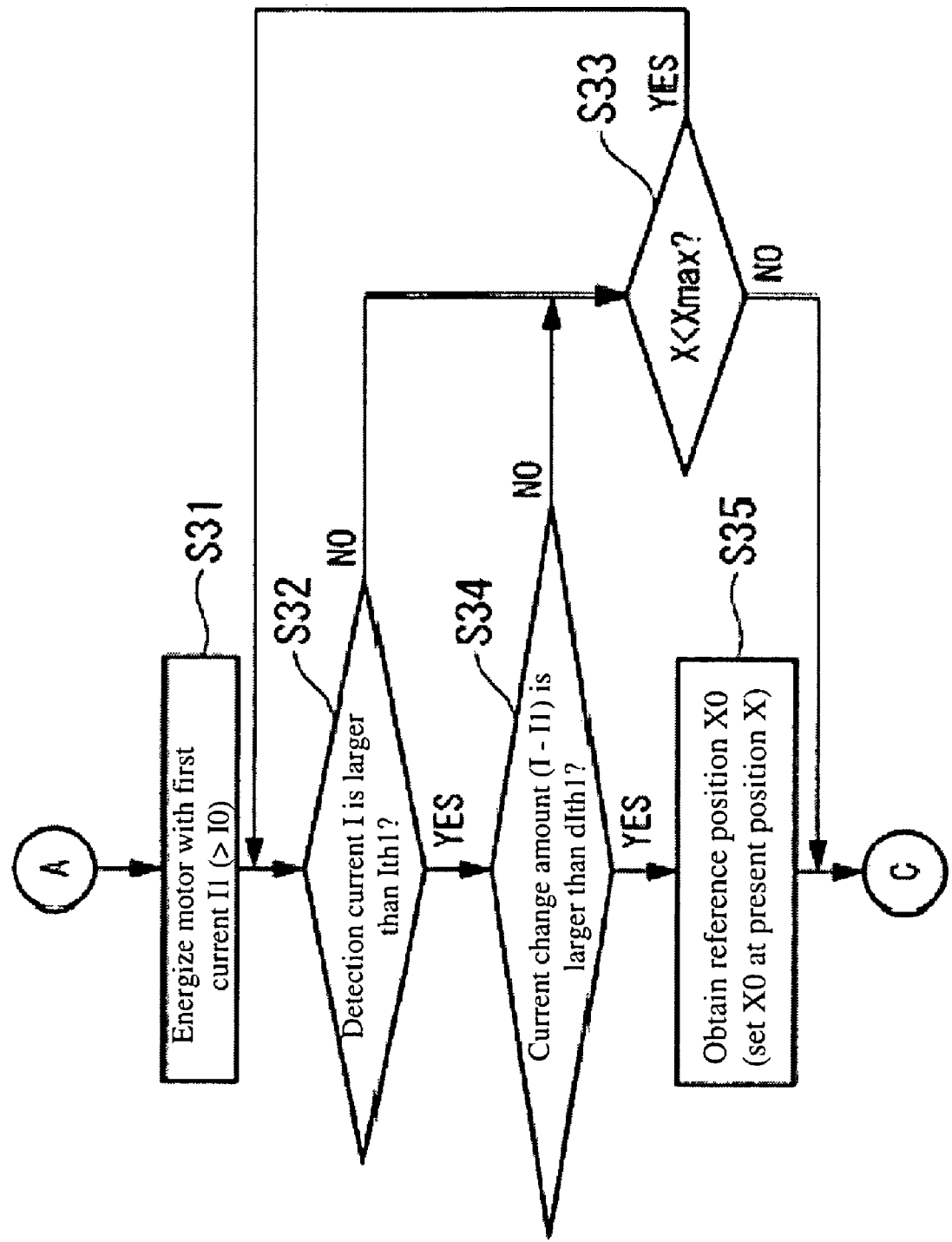
FIGS. 10A and 10B are flowcharts showing elastic determination processing of FIG. 8.

For example in Step S31 of FIG. 10A, the energization of the motor 10 with a predetermined first current I1 which is larger than the predetermined current I0, and the winding up of the belt 5 is started with the belt reel 14. In Step S32, it is determined whether or not the detection current I detected by the current sensor 67 is larger than a predetermined first current threshold Ith1. When the determination result is "NO" in Step S32, the flow goes to Step S33. On the other hand, when the determination result is "YES" in Step S32, that is, when the current necessary to drive the motor 10 in the forward rotation direction is increased as the load on the winding up of the belt 5 by the belt reel 14 is increased, the flow goes to Step S34 to be described later.

In Step S33, it is determined whether or not the present position X of the rotational position of the belt reel 14 is smaller than the maximum wind-up position Xmax corresponding to the predetermined maximum wind-up amount of the belt 5. When the determination result 0is "YES" in Step S33, the flow returns to Step S32. On the other hand, when the determination result is "NO" in Step S33, the process is ended.

In Step S34, it is determined whether or not the current change amount (I-I1) obtained by subtracting the predetermined first current I1 from the detection current I is larger than a predetermined first current change threshold dIth1. When the determination result is "NO" in Step S34, the flow goes to Step S33. On the other hand, when the determination result is "YES" in Step S34, that is, when the current necessary to drive the motor 10 in the forward rotation direction is increased as the load on the winding up of the belt 5 by the belt reel 14 is increased, the flow goes to Step S35.

In Step S35, the present position X of the rotational position of the belt reel 14, detected at this point, is set as the reference position X0. Then the process is ended.

Figure 10B:
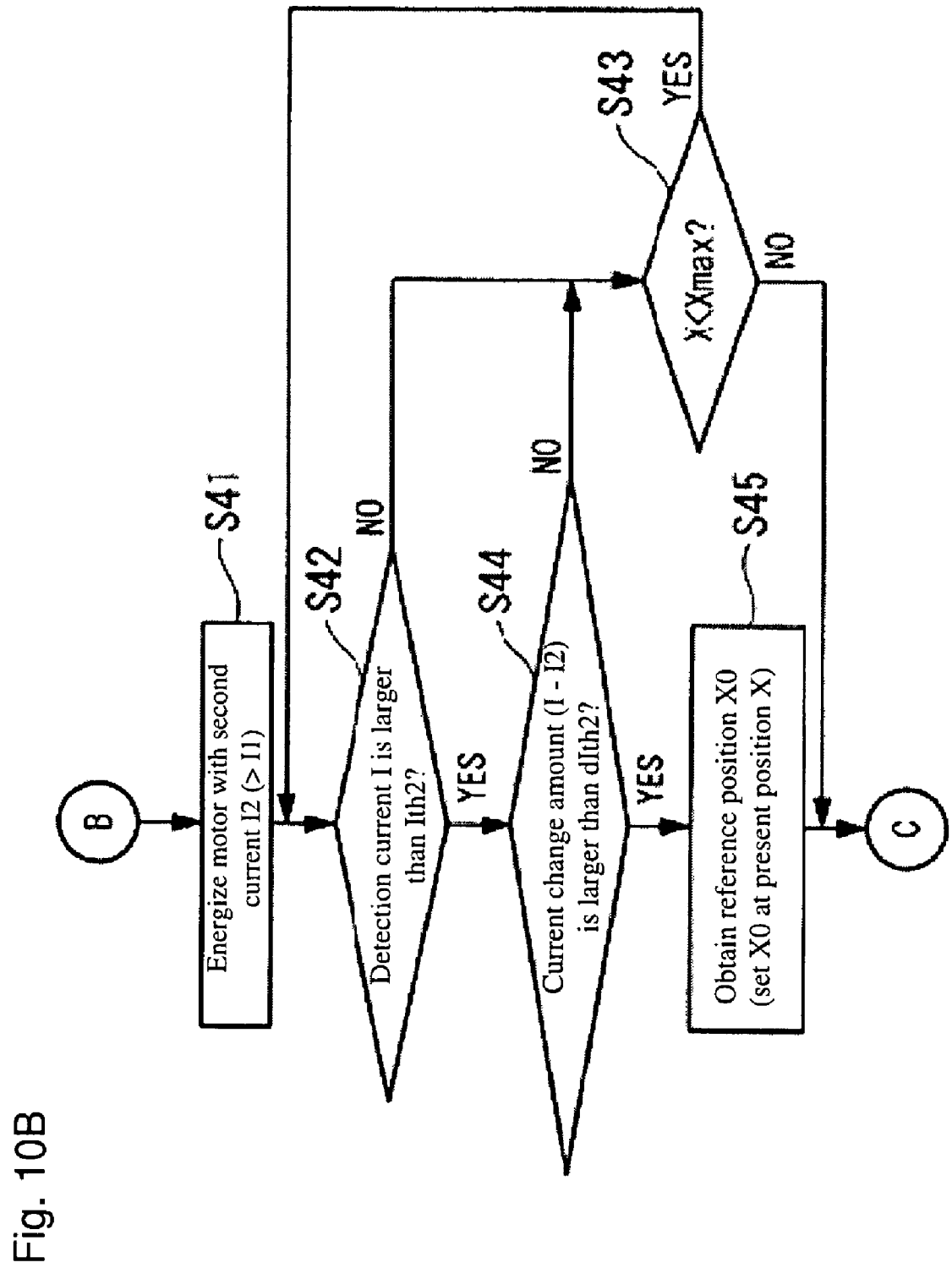

For example in Step S41 of FIG. 10B, the energization of the motor 10 with a predetermined second current I2 which is larger than the predetermined first current I1, and the winding up of the belt 5 is started with the belt reel 14. In Step S42, it is determined whether or not the detection current I detected by the current sensor 67 is larger than a predetermined second current threshold Ith2. When the determination result is "NO" in Step S42, the flow goes to Step S43. On the other hand, when the determination result is "YES" in Step S42, that is, when the current necessary to drive the motor 10 in the forward rotation direction is increased as the load on the winding up of the belt 5 by the belt reel 14 is increased, the flow goes to Step S44 to be described later.

In Step S43, it is determined whether or not the present position X of the rotational position of the belt reel 14 is smaller than the maximum wind-up position Xmax corresponding to the predetermined maximum wind-up amount of the belt 5. When the determination result is "YES" in Step S43, the flow returns to Step S42. On the other hand, when the determination result is "NO" in Step S43, the process is ended.

In Step S44, it is determined whether or not the current change amount (I-I2) obtained by subtracting the predetermined second current I2 from the detection current I is larger than a predetermined second current change threshold dIth2. When the determination result is "NO" in Step S44, the flow goes to Step S43. On the other hand, when the determination result is "YES" in Step S44, that is, when the current necessary to drive the motor 10 in the forward rotation direction is increased as the load on the winding up of the belt 5 by the belt reel 14 is increased, the flow goes to Step S45.

In Step S45, the present position X of the rotational position of the belt reel 14, detected at this point, is set as the reference position X0. Then the process is ended.

Figure 11:
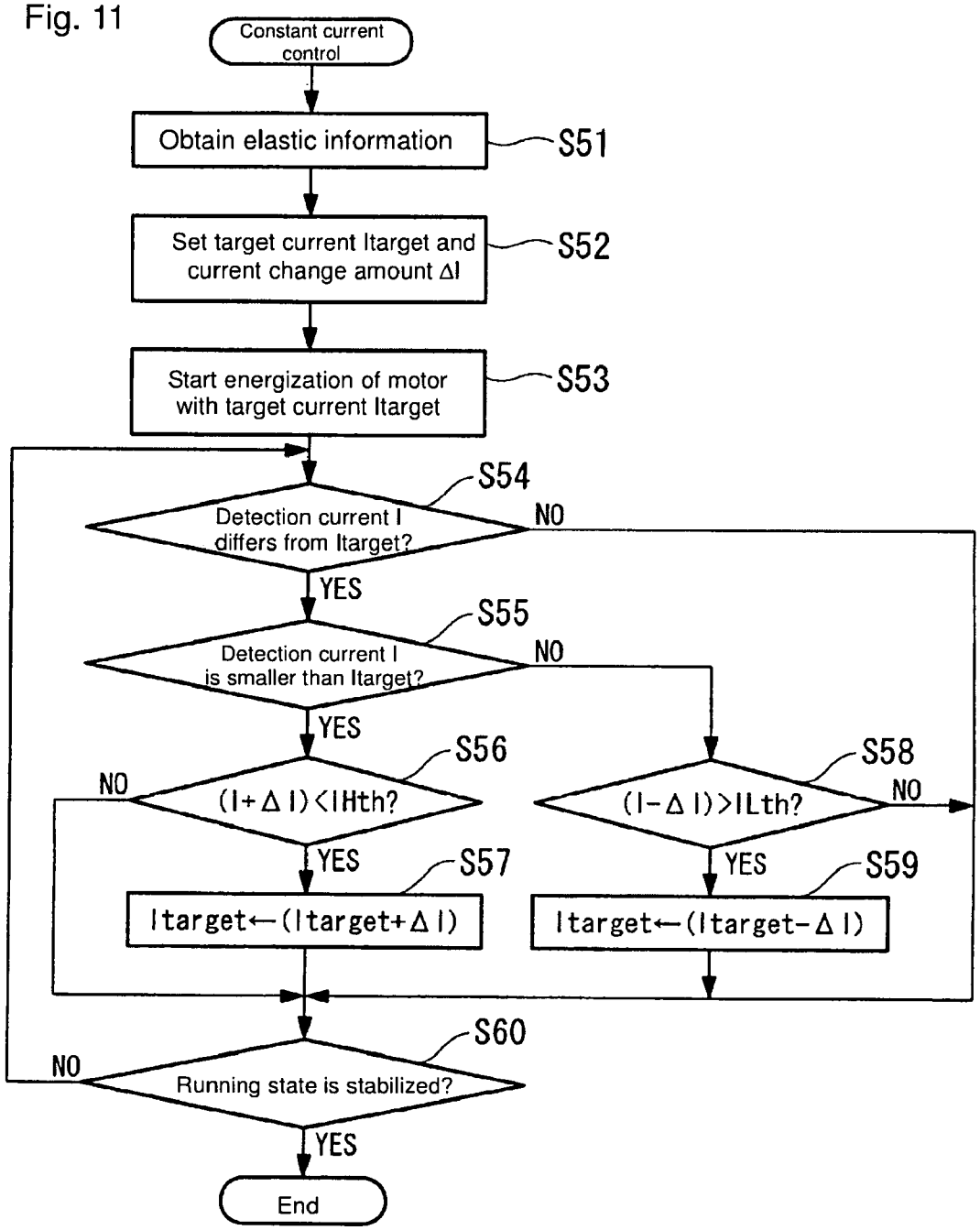
FIG. 11 is a flowchart showing constant current control processing of FIG. 8.

The constant current control processing in Step S04 will be described below. First, for example in Step S51 of FIG. 11, the elastic information having the hardness level is obtained. In Step S52, a target current Itarget which is a target value in the constant current control and a current change amount ΔI which is a control gain in the constant current control are set. When "hard" is set at the hardness level, the target current Itarget and the current change amount ΔI are set at values smaller than those of the hardness level of "middle". When "soft" is set at the hardness level, the target current Itarget and the current change amount ΔI are set at values larger than those of the hardness level of "middle".

In Step S53, the energization of the motor 10 is started with a target current Itarget. In Step S54, it is determined whether or not the detection current I detected by the current sensor 67 differs from the target current Itarget. When the determination result is "NO" in Step S54, that is, when the detection current I is equal to the target current Itarget, the flow goes to Step S60 to be described later. On the other hand, when the determination result is "YES" in Step S54, the flow goes to Step S55.

In Step S55, it is determined whether or not the detection current I is smaller than the target current Itarget. When the determination result is "NO" in Step S55, the flow goes to Step S58 to be described later. On the other hand, when the determination result is "YES" in Step S55, the flow goes to Step S56. In Step S56, it is determined whether or not the value (I+ΔI) obtained by adding the current change amount ΔI to the detection current I is smaller than a predetermined high-side current threshold IHth. When the determination result is "NO" in Step S56, the flow goes to Step S60 to be described later. On the other hand, when the determination result is "YES" in Step S56, the flow goes to Step S57. In Step S57, the value (Itarget+ΔI) obtained by adding the current change amount ΔI to the target current Itarget is set as a new target current Itarget, and the flow goes to Step S60.

In Step S58, it is determined whether or not the value (I−ΔI) obtained by subtracting the current change amount ΔI from the detection current I is larger than a predetermined low-side current threshold ILth. When the determination result is "NO" in Step S58, the flow goes to Step S60. On the other hand, when the determination result is "YES" in Step S58, the flow goes to Step S59. In Step S59, the value (Itarget−ΔI) obtained by subtracting the current change amount ΔI from the target current Itarget is set as a new target current Itarget, and the flow goes to Step S60. In Step S60, it is determined whether or not the vehicle running state is stabilized. When the determination result is "NO" in Step S60, the flow returns to Step S54. On the other hand, when the determination result is "YES" in Step S60, the process is ended.

Figure 12:
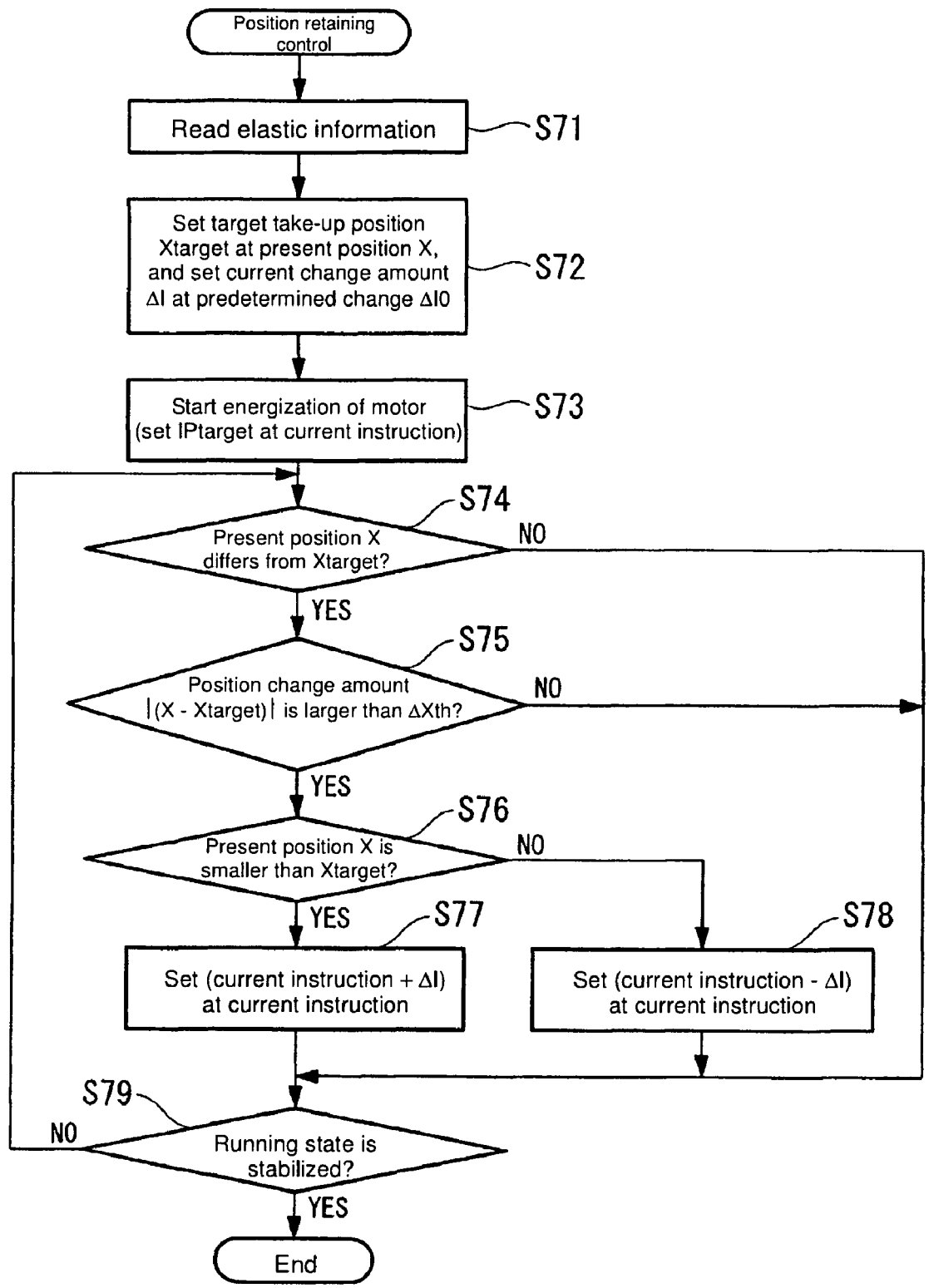
FIG. 12 is a flowchart showing position retaining control processing of FIG. 8.

The position retaining control processing in Step S06 will be described below. First, for example in Step S71 of FIG. 12, the elastic information having the hardness level is obtained. In Step S72, based on the elastic information, the present position X of the rotational position of the belt reel 14, detected at this point, is set to a target wind-up position Xtarget which is a target value for the rotational position of the belt reel 14 in the position retaining control, and a predetermined change ΔI0 is set to the current change amount ΔI which is the control gain in the position retaining control. For example, when "hard" is set at the hardness level, the target wind-up position Xtarget and the current change amount ΔI are set at values smaller than those of the hardness level of "middle". When "soft" is set at the hardness level, the target wind-up position Xtarget and the current change amount ΔI are set at values larger than those of the hardness level of "middle".

In Step S73, a predetermined target current IPtarget is set as a current instruction for energizing the motor 10, and the energization is started with the current instruction. In Step S74, it is determined whether or not the present position X of the rotational position of the belt reel 14, detected at this point, differs from the target wind-up position Xtarget. When the determination result is "NO" in Step S74, the flow goes to Step S79 to be described later. On the other hand, when the determination result is "YES" in Step S74, the flow goes to Step S75.

In Step S75, it is determined whether or not the absolute value $|(X-Xtarget)|$ of the position change amount obtained by subtracting the target wind-up position Xtarget from the present position X is larger than a predetermined position change amount threshold $\Delta Xth$. When the determination result is "NO" in Step S75, the flow goes to Step S79 to be described later. On the other hand, when determination result is "YES" in Step S75, the flow goes to Step S76.

In Step S76, it is determined whether or not the present position X is smaller than the target wind-up position Xtarget. When the determination result is "YES" in Step S76, the flow goes to Step S77. In Step S77, the value (current instruction+$\Delta I$) obtained by adding the current change amount $\Delta I$ to the current instruction is set as a new current instruction, and the flow goes to Step S79. On the other hand, when the determination result is "NO" in Step S76, the flow goes to Step S78. In Step S78, the value (current instruction−$\Delta I$) obtained by subtracting the current change amount $\Delta I$ from the current instruction is set as a new current instruction, and the flow goes to Step S79.

In Step S79, it is determined whether or not the vehicle running state is stabilized. When the determination result is "NO" in Step S79, the flow returns to Step S74. On the other hand, when the determination result is "YES" in Step S79, the process is ended.

Figure 13B:
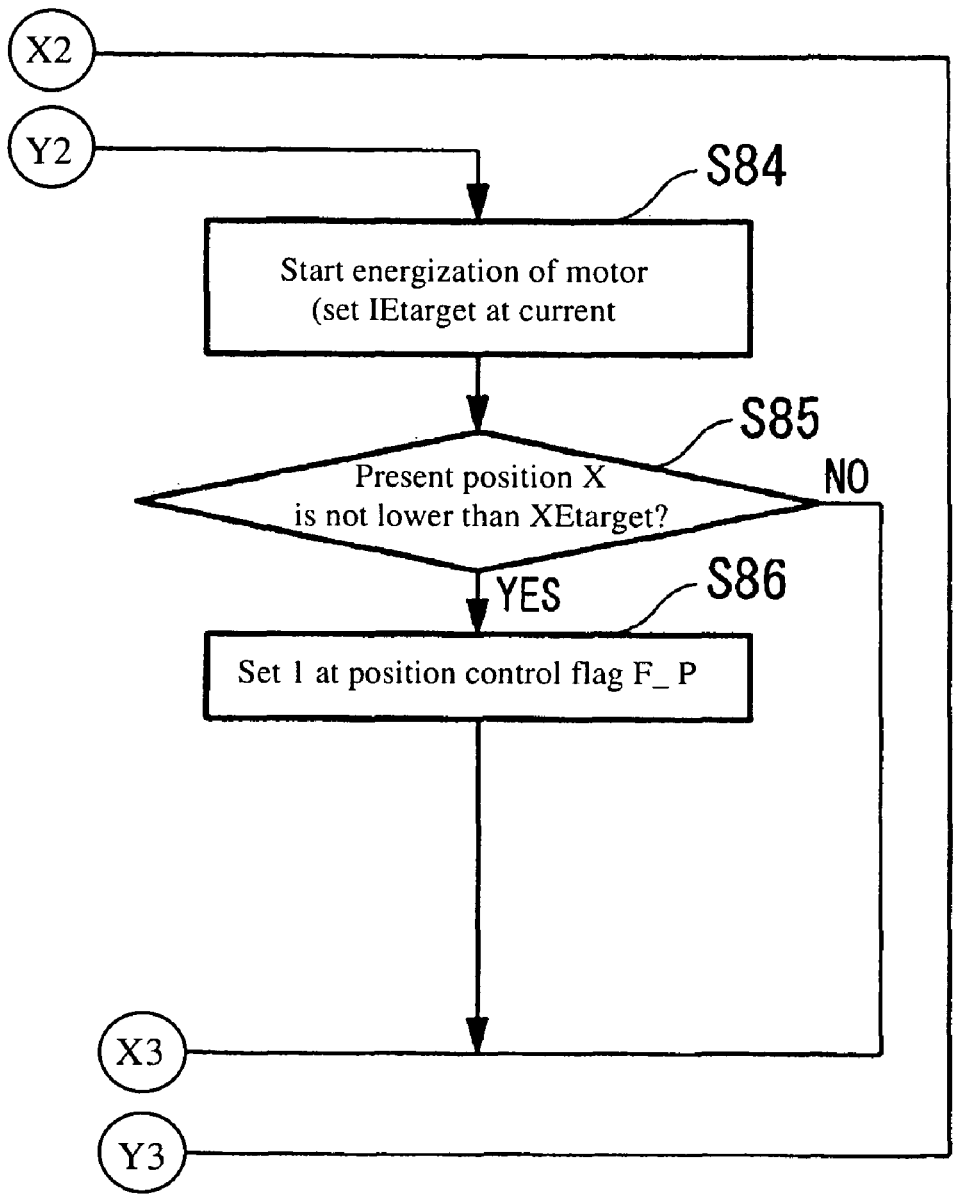

The emergency wind-up control processing in Step S07 will be described below. First, for example in Step S81 of FIG. 13A, the elastic information having the hardness level is obtained. In Step S82, based on the elastic information, a predetermined target emergency wind-up position XEtarget which is a target value for the rotational position of the belt reel 14 in the emergency wind-up control and the current change amount $\Delta I$ which is the control gain in the emergency wind-up control are set while the flag value of a position control flag F_P is set to "0". The position control flag F_P provides an instruction for performing the position control in which the current-carrying amount of the motor 10 is increased or decreased such that the rotational position of the belt reel 14 is maintained at the target emergency wind-up position XEtarget. When "hard" is set at the hardness level, the target emergency wind-up position XEtarget and the current change amount $\Delta I$ are set at values smaller than those of the hardness level of "middle". When "soft" is set at the hardness level, the target emergency wind-up position XEtarget and the current change amount $\Delta I$ are set at values larger than those of the hardness level of "middle".

In Step S83, it is determined whether or not the position control flag F_P has the flag value of "1". When the determination result is "YES" in Step S83, the flow goes to Step S88. On the other hand, when the determination result is "NO" in Step S83, the flow goes to Step S84.

In Step S84, a predetermined target emergency wind-up current IEPtarget is set as a current instruction for energizing the motor 10, and the energization is started with the current instruction. In Step S85, it is determined whether or not the present position X of the rotational position of the belt reel 14, detected at this point, is not lower than a target emergency wind-up position XEtarget. When the determination result is "NO" in Step S85, the flow goes to Step S87 to be described later. On the other hand, when the determination result is "YES" in Step S85, the flow goes to Step S86. In Step S86, the flag value of the position control flag F_P is set to "1", and the flow goes to Step S87.

In Step S87, it is determined whether or not the vehicle running state is stabilized. When the determination result is "NO" in Step S87, the flow returns to Step S83. On the other hand, when the determination result is "YES" in Step S87, the process is ended.

In Step S88, it is determined whether or not the present position X of the rotational position of the belt reel 14, detected at this point, differs from the target emergency wind-up position XEtarget. When the determination result is "NO" in Step S88, the flow goes to Step S87. On the other hand, when the determination result is "YES" in Step S88, the flow goes to Step S89. In Step S89, it is determined whether or not the absolute value $|(X-XEtarget)|$ of the position change amount obtained by subtracting the target emergency wind-up position XEtarget from the present position X is larger than a predetermined position change amount threshold $\Delta Xth$. When the determination result is "NO" in Step S89, the flow goes to Step S87. On the other hand, when the determination result is "YES" in Step S89, the flow goes to Step S90.

In Step S90, it is determined whether or not the present position X is smaller than the target emergency wind-up position XEtarget. When the determination result is "YES" in Step S90, the flow goes to Step S91. In Step S91, the value (current instruction+$\Delta I$) obtained by adding the predetermined current change amount $\Delta I$ in the emergency wind-up control to the current instruction is set as a new current instruction, and the flow goes to Step S87. When the determination result is "NO" in Step S90, the flow goes to Step S92. In Step S92, the value (current instruction−$\Delta I$) obtained by subtracting the current change amount $\Delta I$ from the current instruction is set as a new current instruction, and the flow goes to Step S87.

Thus, in the vehicle seatbelt apparatus 1 of the present embodiment, after the motor 10 is driven with the predetermined current I0 to wind up the belt 5 on the belt reel 14, the connection of the clutch in the power transmission mechanism 18 is released, and the return amount is measured when the belt 5 is returned in the drawing direction. Therefore, the loosened state of the belt 5 can directly be measured, and the control target (the target current Itarget or the current instruction) and the control gain (the current change amount $\Delta I$) can be changed in each control mode (the constant current control mode, the position retaining control mode, and the emergency wind-up control mode) according to the measurement result to properly reflect the loosened state of the belt 5 in performing each control mode.

In the above-described embodiment, the control target (the target current Itarget or the current instruction) and the control gain (the current change amount $\Delta I$) are changed based on the position change amount (X0-X1) in each control mode (the constant current control mode, the position retaining control mode, and the emergency wind-up control mode). The present invention is not limited thereto, and only one of the control target and the control gain may be changed.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A vehicle seatbelt apparatus comprising:
   a belt;
   a belt reel around which the belt is wound;
   a position detector configured to detect a rotational position of the belt reel;
   a motor configured to rotate the belt reel;
   a clutch configured to connect or disconnect the motor and the belt reel; and
   a control device configured to control the clutch and a current supplied to the motor and comprising:
      a return amount detector configured to detect a return amount of the belt reel in a drawing direction of the belt based on the rotational position of the belt reel detected by the position detector after the belt is wound around the belt reel and then the clutch disconnects the motor and the belt reel.

2. The vehicle seatbelt apparatus according to claim 1, wherein the control device comprises
   a constant current mode controller configured to perform a constant current control mode in which the current supplied to the motor is controlled to be kept substantially at a predetermined current, the constant current mode controller being configured to change a target current or a control gain in the constant current control mode based on the return amount.

3. The vehicle seatbelt apparatus according to claim 1, wherein the control device comprises
   a position retaining mode controller configured to perform a position retaining control mode in which the current supplied to the motor is controlled to keep the rotational position of the belt reel to be substantially at a predetermined rotational position, the position retaining mode controller being configured to change a target retention position or a control gain in the position retaining control mode based on the return amount.

4. The vehicle seatbelt apparatus according to claim 1, wherein the control device comprises
   an emergency wind-up mode controller configured to perform an emergency wind-up control mode in which a maximum current is supplied to the motor and then the current supplied to the motor is controlled to keep the rotational position of the belt reel to be substantially at a predetermined wind-up position when the rotational position of the belt reel reaches the predetermined wind-up position, the emergency wind-up mode controller being configured to change the predetermined wind-up position or a control gain in the emergency wind-up control mode based on the return amount.

5. The vehicle seatbelt apparatus according to claim 1, wherein the clutch is configured to connect the motor and the belt reel when the motor is driven to rotate the belt reel so that the belt is wound around the belt reel.

6. The vehicle seatbelt apparatus according to claim 1, wherein the clutch is configured to disconnect the motor and the belt reel when the motor is driven to rotate the belt reel so that the belt is unwound.

7. The vehicle seatbelt apparatus according to claim 1, wherein the control device comprises
   a running state detector configured to detect a running state of a vehicle; and
   a control mode determination unit configured to determine a control mode for controlling the motor.

8. The vehicle seatbelt apparatus according to claim 7, wherein the control mode comprises at least one of
   a constant current control mode in which the current supplied to the motor is controlled to be kept substantially at a predetermined current,
   a position retaining control mode in which the current supplied to the motor is controlled to keep the rotational position of the belt reel to be substantially at a predetermined rotational position, and
   an emergency wind-up control mode in which a maximum current is supplied to the motor and then the current supplied to the motor is controlled to keep the rotational position of the belt reel to be substantially at a predetermined wind-up position when the rotational position of the belt reel reaches the predetermined wind-up position.

9. The vehicle seatbelt apparatus according to claim 1, wherein the return amount detector comprises
   a reference point detecting unit configured to detect a reference point, a change amount in a detected current supplied to the motor being equal to a threshold current change amount at the reference point while the motor is driven to wind the belt around the belt reel, and
   a change position detecting unit configured to detect a change position, a change amount in a rotational position of the belt reel being equal to a threshold rotational position change amount at the change point while the motor is driven to wind the belt around the belt reel, the return amount detector being configured to detect the return amount by calculating the difference between the reference point and the change point.

10. A vehicle seatbelt apparatus comprising:
    a belt;
    a belt reel around which the belt is wound;
    position detecting means for detecting a rotational position of the belt reel;
    motor means for rotating the belt reel;
    clutch means for connecting or disconnecting the motor means and the belt reel; and
    control means for controlling the clutch means and a current supplied to the motor means and comprising:
       return amount detecting means for detecting a return amount of the belt reel in a drawing direction of the belt based on the rotational position of the belt reel detected by the position detecting means after the belt is wound around the belt reel and then the clutch means disconnects the motor means and the belt reel.

11. A vehicle comprising:
    a seatbelt apparatus comprising:
       a belt;
       a belt reel around which the belt is wound;
       a position detector configured to detect a rotational position of the belt reel;
       a motor configured to rotate the belt reel;
       a clutch configured to connect or disconnect the motor and the belt reel; and
       a control device configured to control the clutch and a current supplied to the motor and comprising:
          a return amount detector configured to detect a return amount of the belt reel in a drawing direction of the belt based on the rotational position of the belt reel detected by the position detector after the belt is wound around the belt reel and then the clutch disconnects the motor and the belt reel.

12. A method for controlling a vehicle seatbelt, comprising:

detecting a rotational position of a belt reel around which a belt is wound;

providing a motor to rotate the belt reel;

providing a clutch to connect or disconnect the motor and the belt reel;

controlling the clutch and a current supplied to the motor; and detecting a return amount of the belt reel in a drawing direction of the belt based on the rotational position of the belt reel after the belt is wound around the belt reel and then the clutch disconnects the motor and the belt reel.

* * * * *